United States Patent
Shimada

(10) Patent No.: US 10,964,225 B2
(45) Date of Patent: Mar. 30, 2021

(54) INFORMATION PROCESSING APPARATUS

(71) Applicant: FUJI XEROX CO., LTD., Tokyo (JP)

(72) Inventor: Yuhei Shimada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 240 days.

(21) Appl. No.: 15/806,805

(22) Filed: Nov. 8, 2017

(65) Prior Publication Data

US 2018/0218629 A1    Aug. 2, 2018

(30) Foreign Application Priority Data

Jan. 30, 2017    (JP) ................. 2017-013760

(51) Int. Cl.
| | |
|---|---|
| G09B 7/00 | (2006.01) |
| G09B 7/10 | (2006.01) |
| G09B 5/02 | (2006.01) |
| G09B 7/02 | (2006.01) |
| G06Q 30/02 | (2012.01) |

(52) U.S. Cl.
CPC ............. *G09B 7/10* (2013.01); *G09B 5/02* (2013.01); *G09B 7/02* (2013.01); *G06Q 30/0203* (2013.01)

(58) Field of Classification Search
CPC ... G09B 7/00; G09B 7/04; G09B 7/06; G09B 7/08; G06Q 30/0217; G06Q 30/0203
See application file for complete search history.

(56) References Cited

U.S. PATENT DOCUMENTS

| | | | | |
|---|---|---|---|---|
| 2006/0003296 | A1* | 1/2006 | Dockterman ............ | G09B 7/00 434/188 |
| 2006/0194182 | A1* | 8/2006 | Anand ...................... | G09B 7/06 434/322 |
| 2009/0104592 | A1* | 4/2009 | Miltenberger ........... | G09B 7/00 434/362 |
| 2009/0150217 | A1* | 6/2009 | Luff ........................ | G06Q 30/02 705/7.32 |
| 2011/0039249 | A1* | 2/2011 | Packard ................... | G09B 5/00 434/362 |
| 2014/0143157 | A1* | 5/2014 | Jeffs ........................ | G06Q 30/016 705/304 |
| 2015/0056597 | A1 | 2/2015 | Kutty et al. | |
| 2015/0064680 | A1* | 3/2015 | Lee .......................... | G09B 7/02 434/350 |
| 2015/0079555 | A1* | 3/2015 | Alexander ................ | G09B 7/04 434/169 |

(Continued)

FOREIGN PATENT DOCUMENTS

| | | |
|---|---|---|
| JP | 2004-348226 A | 12/2004 |
| JP | 2005-258955 A | 9/2005 |

(Continued)

OTHER PUBLICATIONS

Nov. 10, 2020 Office Action issued in Japanese Patent Application No. 2017-013760.

*Primary Examiner* — Peter R Egloff
(74) *Attorney, Agent, or Firm* — Oliff PLC

(57) ABSTRACT

An information processing apparatus includes a question output controller that selects and outputs an easier question to respond from plural questions as a time difference between a time associated with an event and an expected response time that is a time at which a respondent of a question about the event is likely to respond is larger.

17 Claims, 35 Drawing Sheets

(56) References Cited

U.S. PATENT DOCUMENTS

| | | | | |
|---|---|---|---|---|
| 2015/0324811 A1* | 11/2015 | Courtright | ............ | G06Q 30/02 |
| | | | | 705/7.32 |
| 2016/0134429 A1 | 5/2016 | Shimada | | |
| 2016/0180359 A1* | 6/2016 | Qu | .................... | G06Q 30/0203 |
| | | | | 705/7.32 |
| 2016/0314702 A1* | 10/2016 | Park | ....................... | G06Q 50/20 |

FOREIGN PATENT DOCUMENTS

| | | | |
|---|---|---|---|
| JP | 2007-172339 | A | 7/2007 |
| JP | 2009-232314 | A | 10/2009 |
| JP | 2011-227767 | A | 11/2011 |
| JP | 2013-206217 | A | 10/2013 |
| JP | 2013-210917 | A | 10/2013 |
| JP | 2015-166815 | A | 9/2015 |
| JP | 2016-35690 | A | 3/2016 |
| JP | 2016-095575 | A | 5/2016 |

* cited by examiner

FIG.3

QUESTION GROUP DB

| QUESTION GROUP ID | QUESTION GROUP NAME | SCHEDULED DISTRIBUTION DATE AND TIME | DISTRIBUTION TARGET PERSON |
|---|---|---|---|
| g001 | SATISFACTION RESEARCH OF STORE A | 2016/09/20 10:00:20 | X001, X003 |
| g002 | USAGE CONDITION RESEARCH OF STORE B | 2016/09/23 12:00:00 | X001, X003, X004 |
| ... | ... | ... | ... |

FIG.4

QUESTION DB

| QUESTION ID | QUESTION GROUP ID | QUESTION TEXT | RESPONSE ITEM | RESPONSE VALID TIME RANGE (MIN) |
|---|---|---|---|---|
| q001 | g001 | Please write good things about store freely. | FREE DESCRIPTION | LESS THAN 3 MIN |
| q002 | g001 | Please choose good things about store (any number). | TASTE, QUANTITY, PRICE, PROVISION TIME, CLEANLINESS, CUSTOMER SERVICE, ATMOSPHERE | 3 MIN OR MORE, LESS THAN 60 MIN |
| q003 | g001 | This store is ....... Please choose one best thing about store. | TASTE, QUANTITY, PRICE | 60 MIN OR MORE, LESS THAN 1440 MIN |
| ... | ... | ... | ... | ... |

FIG.5

DISTRIBUTION DB

| DISTRIBUTION ID | DISTRIBUTION DATE AND TIME | QUESTION GROUP ID | DISTRIBUTION TARGET LIST |
|---|---|---|---|
| d001 | 2016/09/20 10:00:20 | g001 | X001, X003 |
| d002 | 2016/09/23 12:00:12 | g002 | X001, X003, X004 |
| ... | ... | ... | ... |

FIG.6

RESPONSE DB

| RESPONSE ID | RESPONSE START TIME | RESPONDENT ID | QUESTION GROUP ID | QUESTION ID | RESPONSE ITEM | DISTRIBUTION ID |
|---|---|---|---|---|---|---|
| a001 | 2014/09/05 10:48:02 | x023 | g001 | q001 | Antique atmosphere of store is ... | d001 |
| a002 | 2014/09/05 18:55:22 | x046 | g001 | q002 | TASTE, CUSTOMER SERVICE, ATMOSPHERE | d001 |
| a003 | 2014/09/06 09:15:22 | x092 | g001 | q003 | TASTE | d001 |
| ... | ... | ... | ... | ... | ... | ... |

FIG.21

POSITION INFORMATION DB

| POSITION INFORMATION ID | DETECTION START TIME | DETECTION END TIME | DETECTED USER | DETECTION POSITION |
|---|---|---|---|---|
| d001 | 2016/09/05 10:34:34 | 2016/09/05 10:57:01 | X023 | A153 |
| d002 | 2016/09/05 16:46:11 | 2016/09/05 17:13:35 | X016 | C201 |
| ... | ... | ... | ... | ... |

FIG.22

QUESTION GROUP DB

| QUESTION GROUP ID | QUESTION GROUP NAME | DISTRIBUTION AREA AT ARRIVAL | DISTRIBUTION AREA AT DEPARTURE | STAY TIME DISTRIBUTION AREA | STAY TIME |
|---|---|---|---|---|---|
| g001 | SATISFACTION RESEARCH OF STORE A | A155 | - | - | - |
| g002 | USAGE CONDITION RESEARCH OF STORE B | - | - | C201 | 15 |
| ... | ... | ... | ... | ... | ... |

*FIG.23*

QUESTION DB

| QUESTION ID | QUESTION GROUP ID | QUESTION TEXT | QUESTION RESPONSE ITEM LIST | RESPONSE VALID TIME RANGE (MIN) | RESPONSE VALID MOVING DISTANCE RANGE (KM) |
|---|---|---|---|---|---|
| q001 | g001 | Please write good things about store freely. | FREE DESCRIPTION | LESS THAN 3 MIN | LESS THAN 1 Km |
| q002 | g001 | Please choose good things about store (any number). | TASTE, QUANTITY, PRICE, PROVISION TIME, CLEANLINESS, CUSTOMER SERVICE, ATMOSPHERE | 3 MIN OR MORE, LESS THAN 60 MIN | 1 Km OR MORE, LESS THAN 30 Km |
| q003 | g001 | This store is ……. Please choose one best thing about store. | TASTE, QUANTITY, PRICE | 60 MIN OR MORE, LESS THAN 1440 MIN | – |
| ⋮ | ⋮ | ⋮ | ⋮ | ⋮ | ⋮ |

FIG.24

DISTRIBUTION DB

| DISTRIBUTION ID | DISTRIBUTION DATE AND TIME | DISTRIBUTION POSITION | QUESTION GROUP ID | DISTRIBUTION TARGET LIST |
|---|---|---|---|---|
| d001 | 2016/09/05 10:25:02 | 35.6587, 139.7454 | g001 | X023, X046, X092 |
| d002 | 2016/09/05 17:55:22 | 35.6587, 139.7454 | g002 | X003 |
| ... | ... | ... | ... | ... |

FIG.25

RESPONSE DB

| RESPONSE ID | RESPONSE START TIME | RESPONSE END TIME | RESPONDENT ID | QUESTION ID | RESPONSE ITEM | DISTRIBUTION ID |
|---|---|---|---|---|---|---|
| a001 | 2014/09/05 10:26:50 | 2014/09/05 10:30:05 | x023 | q001 | Antique atmosphere of store is .... | d001 |
| a002 | 2014/09/05 12:25:02 | 2014/09/05 12:27:02 | x046 | q002 | TASTE, CUSTOMER SERVICE, ATMOSPHERE | d001 |
| a003 | 2014/09/06 09:15:22 | 2014/09/06 09:15:59 | x092 | q003 | TASTE | d001 |
| ... | ... | ... | ... | ... | ... | ... |

FIG.28

QUESTION DB

| QUESTION ID | QUESTION GROUP ID | QUESTION TEXT | QUESTION RESPONSE ITEM | RESPONDENT SCORE RANGE |
|---|---|---|---|---|
| q001 | g001 | Please write good things about store freely. | FREE DESCRIPTION | 80 OR MORE, LESS THAN 100 |
| q002 | g001 | Please choose good things about store (any number) | TASTE, QUANTITY, PRICE, PROVISION TIME, CLEANLINESS, CUSTOMER SERVICE, ATMOSPHERE | 50 OR MORE, LESS THAN 80 |
| q003 | g001 | This store is ‥‥. Please choose one best thing about store. | TASTE, QUANTITY, PRICE | 30 OR MORE, LESS THAN 50 |
| ... | ... | ... | ... | ... |

FIG.29

QUESTION DB

| QUESTION ID | QUESTION GROUP ID | QUESTION TEXT | RESPONSE ITEM | IMAGE FILE NAME | RESPONSE VALID TIME RANGE (MIN) |
|---|---|---|---|---|---|
| q001 | g001 | Please write that menu you had. | FREE DESCRIPTION | – | LESS THAN 3 MIN |
| q002 | g001 | Please choose the menu you had from the followings. | PHOTO 01, PHOTO 02, PHOTO 03, NOT IN THESE PHOTOS | m101.jpg m102.jpg m103.jpg | 3 MIN OR MORE, LESS THAN 60 MIN |
| ... | ... | ... | ... | ... | ... |

FIG.31

QUESTION DB

| QUESTION ID | QUESTION GROUP ID | QUESTION TEXT | RESPONSE ITEM | MOVING IMAGE FILE NAME | RESPONSE VALID TIME RANGE (MIN) |
|---|---|---|---|---|---|
| q001 | g001 | Please write good things about store freely. | FREE DESCRIPTION | – | LESS THAN 3 MIN |
| q002 | g001 | Please choose good things about store (any number). | TASTE, QUANTITY, PRICE, PROVISION TIME, CLEANLINESS, CUSTOMER SERVICE, ATMOSPHERE, ⋯ | – | 3 MIN OR MORE, LESS THAN 60 MIN |
| q003 | g001 | This store is ……. Please choose one best thing about store. | ⋯ | m001.mp4 | 60 MIN OR MORE, LESS THAN 1440 MIN |
| ⋯ | ⋯ | ⋯ | ⋯ | ⋯ | ⋯ |

FIG.34

INFORMATION PROCESSING APPARATUS

CROSS-REFERENCE TO RELATED APPLICATIONS

This application is based on and claims priority under 35 USC 119 from Japanese Patent Application No. 2017-013760 filed Jan. 30, 2017.

BACKGROUND

(i) Technical Field

The present invention relates to an information processing apparatus.

(ii) Related Art

A system has recently been proposed in which a server distributes questionnaires to terminals of users and collects responses input from the users.

SUMMARY

According to an aspect of the invention, an information processing apparatus includes a question output controller that selects and outputs an easier question to respond from plural questions as a time difference between a time associated with an event and an expected response time that is a time at which a respondent of a question about the event is likely to respond is larger.

BRIEF DESCRIPTION OF THE DRAWINGS

Exemplary embodiments of the present invention will be described in detail based on the following figures, wherein:

FIG. 3 is a view for explaining question group information;

FIG. 4 is a view illustrating question information;

FIG. 5 is a view illustrating distribution information;

FIG. 6 is a view illustrating response information;

FIG. 21 is a view illustrating information stored in a position information DB;

FIG. 22 is a view illustrating question group information.

FIG. 23 is a view illustrating question information;

FIG. 24 is a view illustrating distribution information;

FIG. 25 is a view illustrating response information;

FIG. 28 is a view illustrating question information;

FIG. 29 is a view illustrating question information;

FIG. 31 is a view illustrating question information;

FIG. 34 is a view illustrating a display example of an aggregation result;

DETAILED DESCRIPTION

An exemplary embodiment of the present invention relates to a questionnaire distribution system that distributes a questionnaire about a certain event to a terminal of a user, and collects a response input to the terminal.

First Exemplary Embodiment

Figure 1:
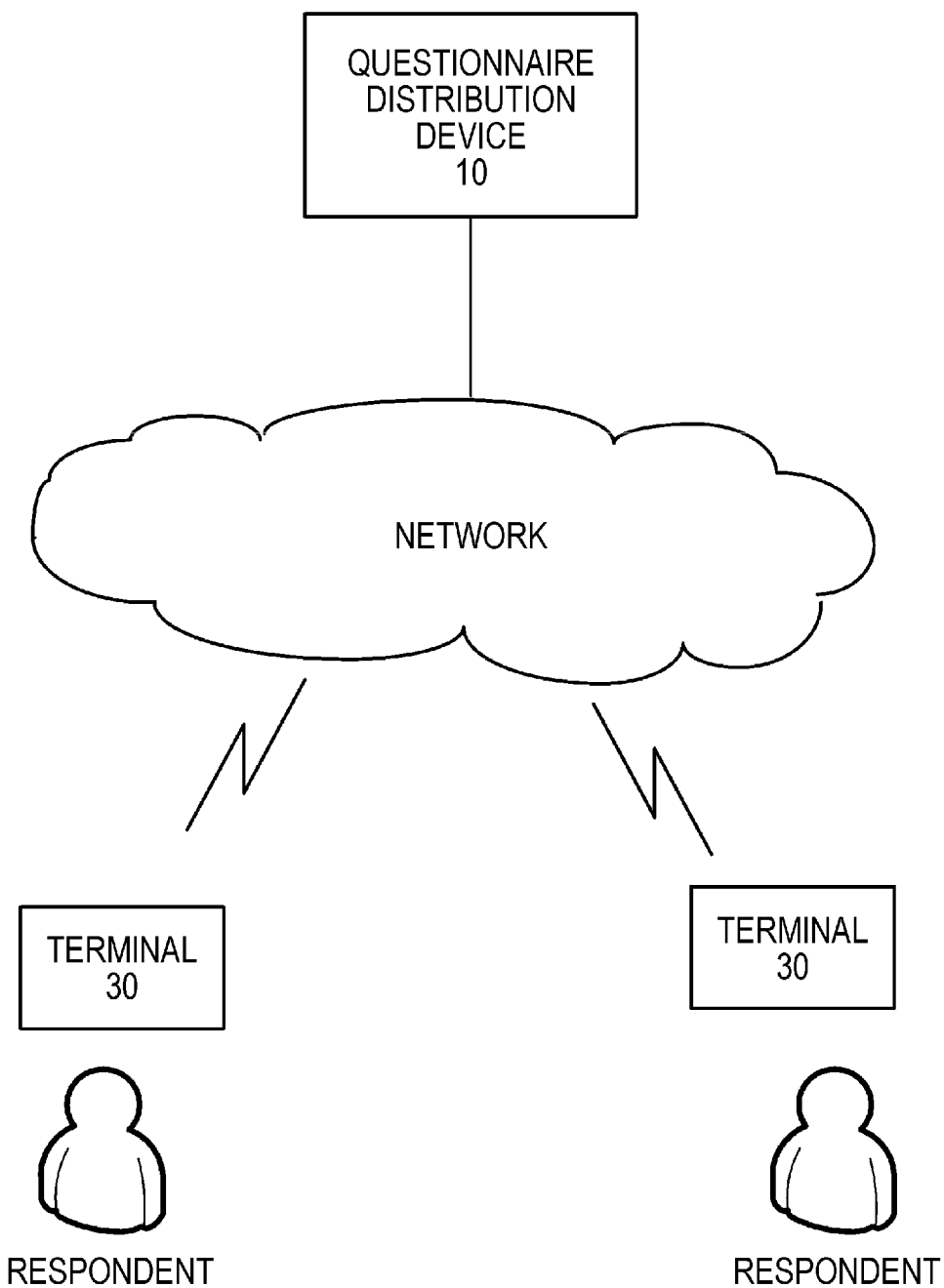
FIG. 1 is a view illustrating a configuration of a questionnaire distribution system according to a first exemplary embodiment of the present invention.

FIG. 1 is a view illustrating a configuration of a questionnaire distribution system according to a first exemplary embodiment of the present invention.

The questionnaire distribution system according to the first exemplary embodiment includes a questionnaire distribution device 10 and a terminal 30 connected through a network.

Figure 2:
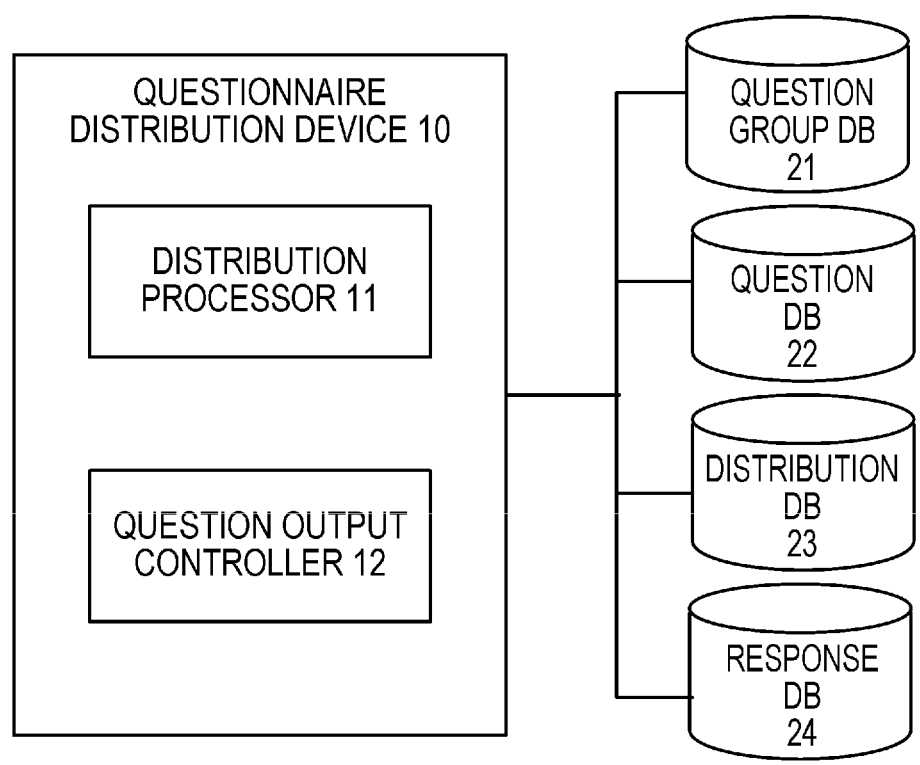
FIG. 2 is a view illustrating an example of a configuration of a questionnaire distribution device.

The configuration of the questionnaire distribution device 10 is exemplified in FIG. 2. The questionnaire distribution device 10 includes a distribution processor 11 and a question output controller 12.

The questionnaire distribution device 10 is connected to a question group database (DB) 21, a question DB 22, a distribution DB 23, and a response DB 24 through a network such as a local area network (LAN). The questionnaire distribution device 10 may include the question group DB 21, the question DB 22, the distribution DB 23, and the response DB 24.

The distribution processor 11 selects question group information satisfying a distribution condition from the question group DB 21. In the present exemplary embodiment, plural questions with different contents are provided for one event as a questionnaire target. The plural questions will be referred to as a question group.

As exemplified in FIG. 3, information stored in the question group DB 21 is question group information including data items (for example, a question group ID for identifying a question group, a question group name, a scheduled distribution date and time, a distribution target person indicating a user ID of a distribution target person of questions, etc.).

As exemplified in FIG. 4, information stored in the question DB 22 is question information including data items (for example, a question ID for identifying a question, a question group ID of a question group to which a question belongs, a question text, a response item of a question, a response valid time range, etc.). Data items of the response valid time range will be described below.

A question of a questionnaire in the present exemplary embodiment includes a question text and a response item of question information. Plural questions belonging to the same question group are questions about the same event, but have different contents, respectively.

For example, referring to FIGS. 3 and 4, plural pieces of question information "q001," "q002," and "q003" belonging to a question group "g001" are registered in the question DB 22. The plural pieces of question information "q001," "q002," and "q003" belonging to the question group "g001" are questions about an event "use of store A." In the question information "q001," a question including a question text "please write good things about the store freely" and a response item "free description" is set. In the question information "q002," a question including a question text "please choose good things about the store (any number)" and a response item "taste, quantity, price, provision time, cleanliness, customer service, atmosphere" is set. In the question information "q003," a question including a question text "This store is . . . . Please choose one best thing about the store" and a response item "taste, quantity, price" is set. In the present exemplary embodiment, the response item corresponds to both indication of response choice items and "free description" that allows an input of an arbitrary character string to be accepted.

The distribution processor 11 distributes a notification (a questionnaire request notification) to the terminal 30 of a distribution target person indicated by question group information selected from the question group DB 21 based on the distribution condition, which asks for a response to a question corresponding to the question group information. The distribution processor 11 registers information indicating distribution contents, in the distribution DB 23.

A distribution form of a questionnaire request notification may be any form. For example, a notification such as an e-mail affixed with a link for accessing a question may be transmitted to the terminal 30 of a target person. In this case, an e-mail address may be input to a distribution target person of the question group DB 21.

As exemplified in FIG. 5, information stored in the distribution DB 23 is distribution information including data items (for example, a distribution ID for identifying a distribution, a distribution date and time, a question group ID of a distributed question, a distribution target list, etc.).

The question output controller 12 acquires a question (a question text and a response item) in question information corresponding to a time difference between a date and time associated with an event and an expected response date and time which is a date and time at which a respondent is likely to respond, from plural pieces of question information associated with the event.

The event-associated date and time may be, for example, an occurrence date and time of an event, a distribution date and time of a questionnaire request notification about an event, or the like. In the present exemplary embodiment, a distribution date and time of a questionnaire request notification about an event is set as an event-associated date and time.

The expected response date and time may be, for example, a date and time at which a respondent tries to start responding to a questionnaire, a date and time at which a request for a response execution is received from the terminal 30, or the like. In the present exemplary embodiment, a date and time at which a predetermined request (a response execution request) for a response execution is received from the terminal 30 is set as an expected response date and time. The response execution request includes a user ID of a respondent, and a question group ID of a question to be responded.

When acquiring a question corresponding to a time difference between an event-associated date and time and an expected response date and time among plural pieces of question information, the question output controller 12 refers to a response valid time range in each question information to select question information in which the time difference falls within a range indicated by the response valid time range.

In the present exemplary embodiment, for question information of the same group ID stored in the question DB 22, a response valid time range corresponding to a longer time is set in the order of question with easy-to-response contents. The easier question to respond may be, for example, a question with the smaller number of response items (response choices, response selections), a question with the larger number of characters of description, or the like. Accordingly, the question output controller 12 acquires an easier question to respond contents as a time difference between an event-associated date and time and an expected response date and time is larger. For example, when plural questions are questions with different response choices, respectively, a question with less response choices is acquired among the plural questions as a time difference between an event-associated date and time and an expected response date and time is larger. When plural questions are questions with different response choices and different numbers of response selections, respectively, a question with the smaller number of response choices and response selections is acquired as a time difference between an event-associated date and time and an expected response date and time is larger. When plural questions are questions with different numbers of characters of the questions, respectively, a question with the larger number of characters of the question is acquired among the plural questions as a time difference between an event-associated date and time and an expected response date and time is larger.

The question output controller 12 transmits a question acquired among plural questions associated with an event, to the terminal 30. The terminal 30 displays a question corresponding to the transmitted question, and transmits information of a response input for the question to the questionnaire distribution device 10. The question output controller 12 stores the information of the response from the terminal 30, in the response DB 24.

As exemplified in FIG. 6, information stored in the response DB 24 is response information including data items (for example, a response ID for identifying a response, a response start time, a respondent ID indicating a user ID of a respondent, a question group ID, a question ID, a response item indicating response contents, a corresponding distribution ID, etc.). The response start time may be, for example, a time when a response execution request is received, a time when information of a response is received from the terminal 30, a response input time recorded at the terminal 30 side, or the like.

The terminal 30 is an information processing apparatus including a processor, a memory, a display, an input unit, a communication unit, and the like. The terminal 30 may be, for example, a smartphone, a tablet, a personal computer (PC), or the like.

The terminal 30 receives a questionnaire request notification distributed from the questionnaire distribution device 10, displays reception of the questionnaire request notification, and transmits a response execution request to the questionnaire distribution device 10 according to a predetermined operation for a questionnaire response by a respondent. The terminal 30 receives and displays a question transmitted from the questionnaire distribution device 10. The terminal 30 transmits information of a response to the displayed question, which is input from a user, to the questionnaire distribution device 10.

Figure 7:
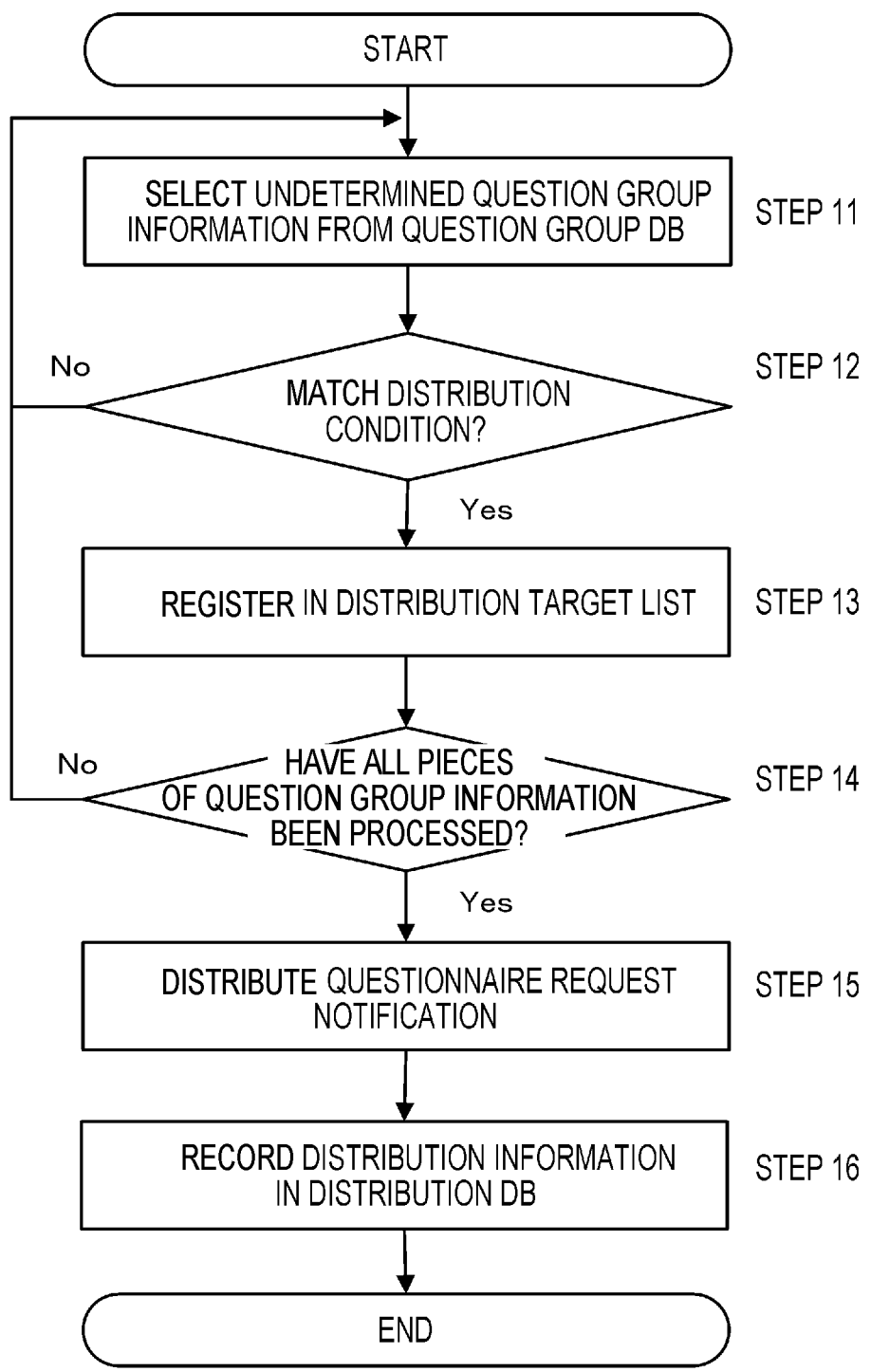
FIG. 7 is a flow chart for explaining a questionnaire request distribution process of the first exemplary embodiment.

Descriptions will be made on a questionnaire request distribution process in which the questionnaire distribution device 10 distributes a request notification of a questionnaire, with reference to a flow chart of FIG. 7.

The distribution processor 11 selects question group information for which a determination process in step 12 to be described below is not completed, from the question group DB 21 (step 11).

The distribution processor 11 determines whether the selected question group information matches a predetermined distribution condition (step 12). The distribution condition in the present exemplary embodiment indicates that, for example, a scheduled distribution time of question group information is within a predetermined time from a current time, and a distribution target person is set.

When it is determined that the selected question group information matches the distribution condition (step 12: "Yes"), the distribution processor 11 registers the selected question group information in a distribution target list (step 13). When it is determined that the selected question group information does not match the distribution condition (step 12: "No"), the process returns to step 11.

When the process of determining whether each question group information registered in the question group DB 21 matches a distribution condition is completed (step 14), the distribution processor 11 distributes a questionnaire request notification corresponding to the question group information registered in the distribution target list, to the terminal 30 of a distribution target person indicated by the question group information (step 15).

After distributing the questionnaire request notification, the distribution processor 11 records distribution information in the distribution DB 23 (step 16).

Figure 8:
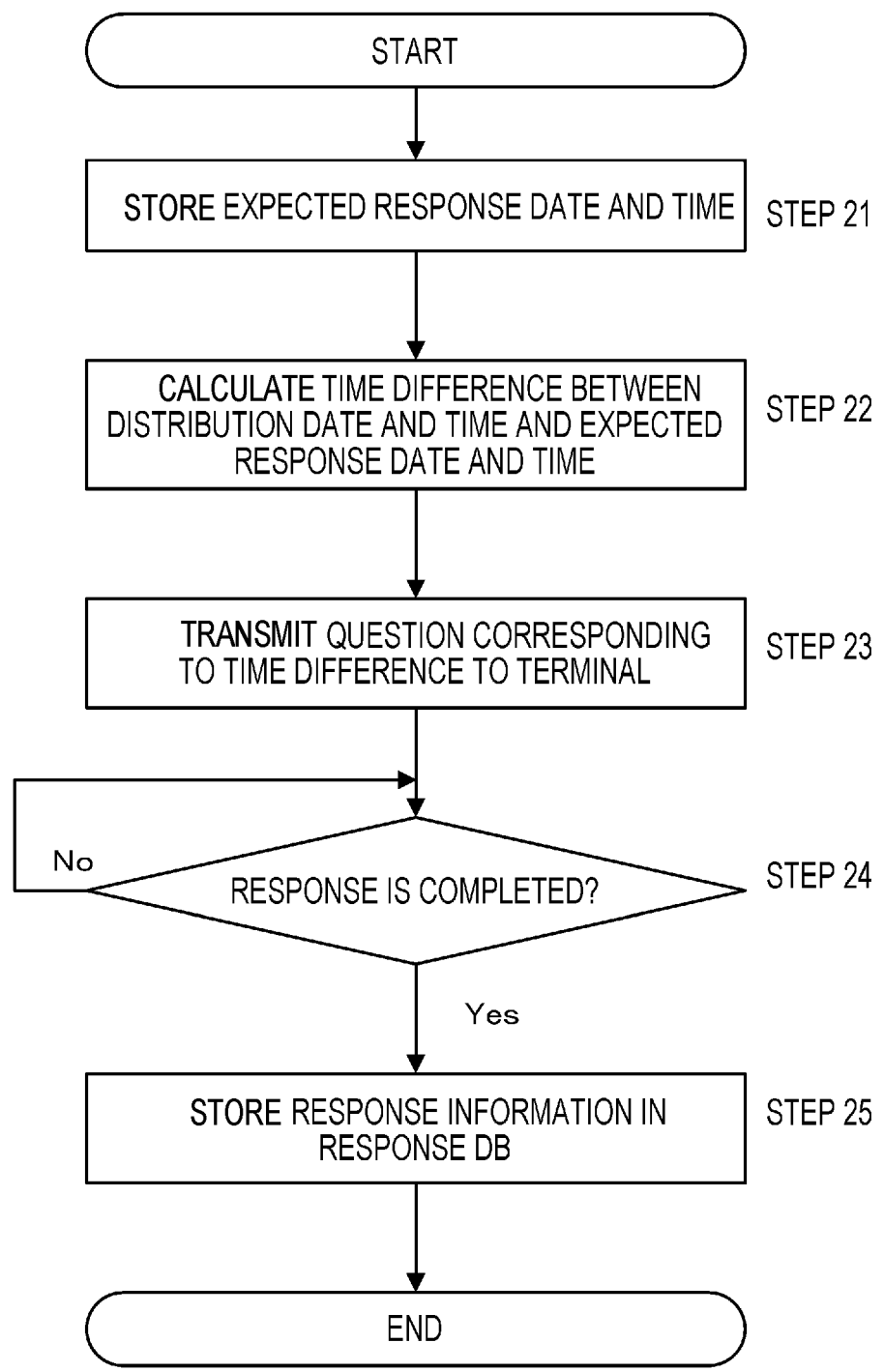
FIG. 8 is a flow chart for explaining a response acceptance process of the first exemplary embodiment.

Descriptions will be made on a response acceptance process in which the questionnaire distribution device 10 accepts response information, with reference to a flow chart of FIG. 8.

Upon receiving a response execution request from the terminal 30, the question output controller 12 stores the reception time as an expected response date and time in a predetermined storage area (step 21).

The question output controller 12 acquires a distribution date and time corresponding to a question group ID included in the response execution request, from the distribution DB 23. The question output controller 12 calculates a time difference between the acquired distribution date and time and the expected response date and time (step 22).

The question output controller 12 selects question information corresponding to the time difference calculated in step 22, among plural pieces of question information corresponding to the question group ID included in the response execution request, acquires a question in the selected question information, and transmits the question to the terminal 30 (step 23).

The terminal 30 displays the transmitted question. When a response input for the displayed question is completed, the terminal 30 transmits information of the input response to the questionnaire distribution device 10.

Upon receiving the information of the response from the terminal 30 (step 24), the question output controller 12 stores response information including the information of the response and the response start time acquired in step 21, in the response DB 24 (step 25).

Figure 9:
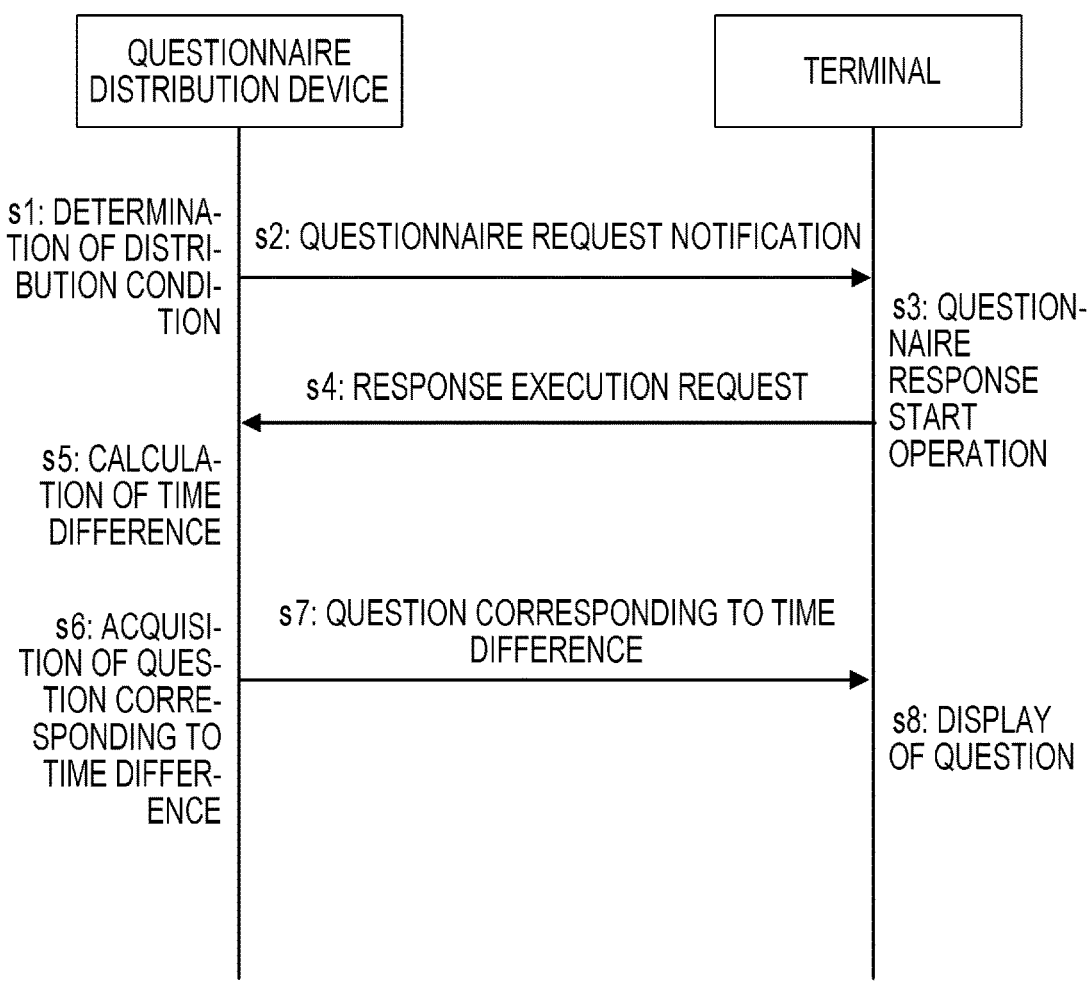
FIG. 9 is a sequence diagram for explaining an operation in the first exemplary embodiment.

Thereafter, as a specific example, descriptions will be made on an operation of the present exemplary embodiment in a case where a question associated with a certain event "visit to store A" is distributed with reference to a sequence diagram of FIG. 9.

For example, each of a user with a user ID "X001" and a user with a user ID "X003" visits a store A and performs a questionnaire member registration from his/her terminal 30. Accordingly, for example, the distribution processor 11 of the questionnaire distribution device 10 registers "X001" and "X003" in a distribution target person of the question group DB 21, in question group information with a question group ID "g001" as exemplified in FIG. 3.

Figure 10:
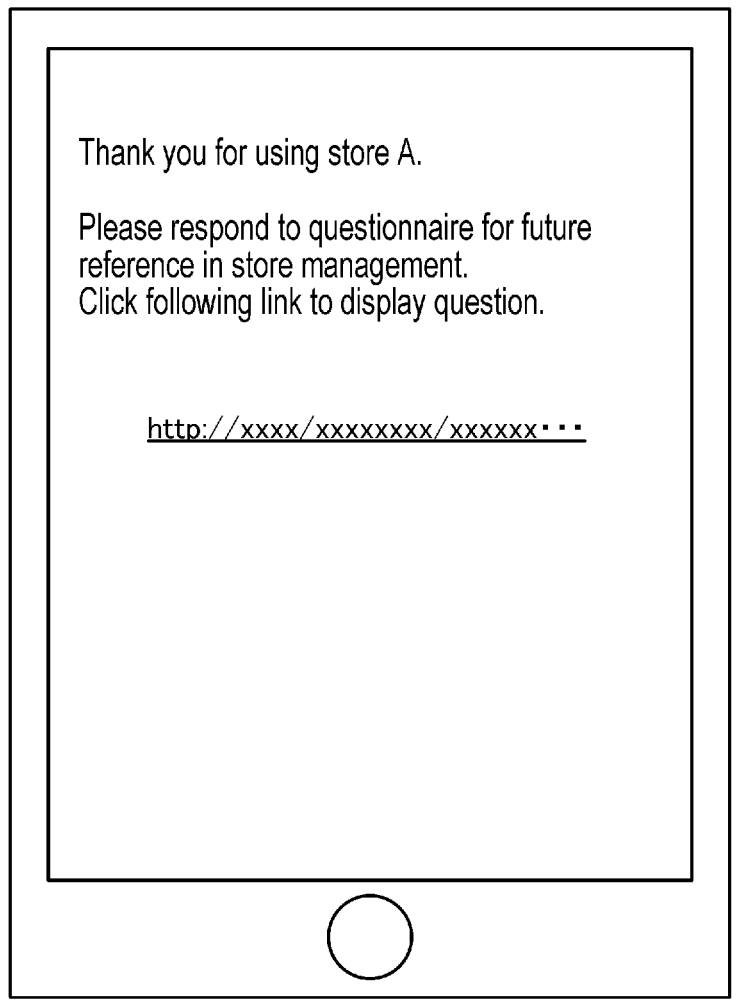
FIG. 10 is a display example of a questionnaire request notification.

When a scheduled distribution date and time set in the question group information with the question group ID "g001" in the question group DB 21 comes, the distribution processor 11 determines that the question group information with the question group ID "g001" matches a distribution condition (s1), and distributes a questionnaire request notification corresponding to the question group information to the terminals 30 of the user IDs "X001" and "X003" (s2). The questionnaire request notification displayed on the terminal 30 of each of the user IDs "X001" and "X003" is exemplified in FIG. 10.

The user with the user ID "X001" starts responding to a questionnaire, for example, immediately after the questionnaire request notification is distributed (s3). With the start of the questionnaire response, the terminal 30 of the user ID "X001" transmits a response execution request to the questionnaire distribution device 10 (s4).

The question output controller 12 of the questionnaire distribution device 10 calculates a time difference "1 min 50 sec" between a reception time (for example, Sep. 20, 2016, 10:02:10) set as an expected response time, when the response execution request is received from the terminal 30 of the user with the user ID "X001," and a distribution time "Sep. 20, 2016, 10:00:20" corresponding to the question group ID "g001" (see, for example, FIG. 3) (s5).

The question output controller 12 acquires a question in question information having a response valid time range corresponding to the time difference "1 min 50 sec," among plural pieces of question information corresponding to the question group ID "g001" included in the response execution request (s6). Since the response valid time range of the question information with a question ID "q001" is "less than 3 min" in the question information of FIG. 4, a question in the question information with the question ID "q001" is acquired. As exemplified in FIG. 4, the question with the question ID "q001" acquired herein is a question in which the number of characters is small in a question text, and a response item indicates a free description.

The question output controller 12 transmits the question with the question ID "q001" to the terminal 30 of the user with the user ID "X001" (s7). Accordingly, the terminal 30 of the user with the user ID "X001" displays the question with the question ID "q001" (s8).

The user with the user ID "X003" starts responding to a questionnaire, for example, two hours after the questionnaire request notification is distributed. With the start of the questionnaire response, the terminal 30 of the user ID "X003" transmits a response execution request to the questionnaire distribution device 10 (s4).

The question output controller 12 of the questionnaire distribution device 10 calculates a time difference "2 hours" between a reception time (for example, Sep. 20, 2016, 12:00:20) set as an expected response time, when the response execution request is received from the terminal 30 of the user with the user ID "X003," and a distribution time "Sep. 20, 2016, 10:00:20" corresponding to the question group ID "g001" (see, for example, FIG. 3) (s5).

The question output controller 12 acquires a question in question information having a response valid time range corresponding to the time difference "2 hours," among plural pieces of question information corresponding to the question group ID "g001" included in the response execution request (s6). Since the response valid time range of the question information with a question ID "q003" is "60 min or more, less than 1,440 min" in the question information of FIG. 4, a question in the question information with the question ID "q003" is acquired. As exemplified in FIG. 4, the question with the question ID "q003" acquired herein is a question in which the number of characters is large in a question text, and the number of response items is small.

The question output controller 12 transmits the question with the question ID "q003" to the terminal 30 of the user with the user ID "X003" (s7). Accordingly, the terminal 30 of the user with the user ID "X003" displays the question with the question ID "q003" (s8).

Figure 11:
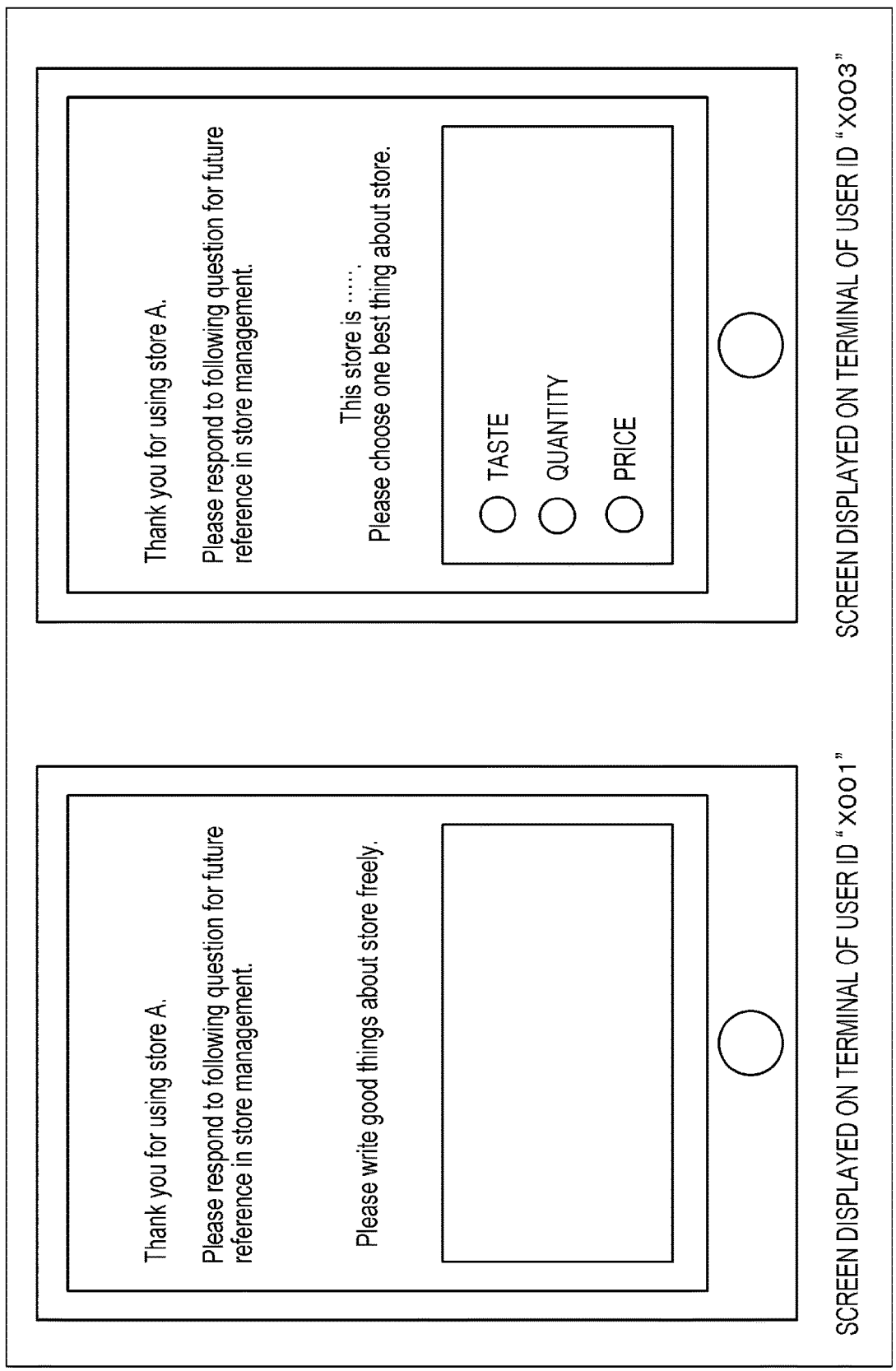
FIG. 11 is a display example of a question.

Questions displayed on the terminal 30 of the user ID "X001" and the terminal 30 of the user ID "X003" are exemplified in FIG. 11. Since the user ID "X003" starts a response after a long time has elapsed, as compared to the user ID "X001," an easier question to respond than a question displayed for the user ID "X001" is displayed on the terminal of the user ID "X003."

Modification of First Exemplary Embodiment

Figure 12:
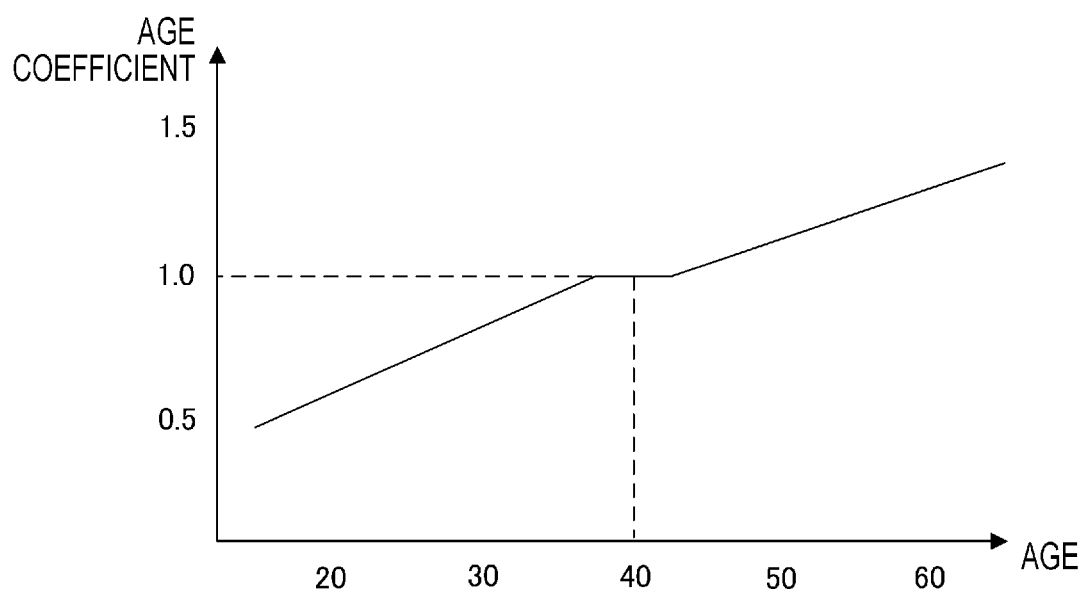
FIG. 12 is a view for explaining an age coefficient.

In the modification of the first exemplary embodiment, when a question to be notified to the terminal 30 is selected from plural questions, the age of a respondent is taken into consideration. The question output controller 12 acquires a question from plural questions based on the time difference between an event-associated date and time and an expected response date and time and the age of a respondent, and transmits the acquired question to the terminal 30. The question output controller 12 acquires an age coefficient corresponding to the age of the respondent. The age coefficient is acquired from a relational expression between an age and a memory ability, and as exemplified in FIG. 12, the coefficient is set to rise with an advancing age. The question output controller 12 acquires an age coefficient corresponding to the age of the respondent. The question output controller 12 calculates a time obtained by multiplying the acquired age coefficient by a time difference between an event-associated date and time and an expected response date and time, as a time difference considering an age, and selects a question corresponding to the time difference.

The method of acquiring the age of the respondent is arbitrary. For example, before a response to a questionnaire about an event is made, the terminal 30 may accept an input regarding the age of the respondent, and transmit the age to the questionnaire distribution device 10.

When a question to be transmitted to the terminal 30 is acquired from plural questions, the stress of the respondent may be taken into consideration. In this case, the question output controller 12 measures, for example, the activation state of the brain, the degree of stress, the degree of concentration, or the like using various sensors such as an electroencephalogram instrument and a pulse sensor, and acquires a stress coefficient corresponding to the stress of the respondent using a stress coefficient acquired from a relational expression between a measured value and a memory ability. The question output controller 12 calculates a stress coefficient-weighted value of a time difference between an event-associated date and time and an expected response date and time, as a time difference considering a stress, and acquires a question corresponding to the time difference.

Another Modification of First Exemplary Embodiment

In another modification of the first exemplary embodiment, when a predetermined time elapses after the selected question is presented to the terminal 30, the question output controller 12 re-calculates a time difference between an event-associated date and time and an expected response date and time, and switches a question to be output to the terminal 30 to a question corresponding to the re-calculated time difference.

While waiting for completion of the response in step 24 of the response acceptance process (FIG. 8), the question output controller 12 acquires an elapsed time from a distribution time of a question in step 23. When a predetermined time elapses, the question output controller 12 re-calculates a time difference between an event-associated date and time and a current time. Then, when a question corresponding to the re-calculated time difference is different from the previously presented question, the question corresponding to the re-calculated time difference is transmitted to the terminal 30.

During the waiting for completion of the response in step 24 of the response acceptance process (FIG. 8), even when a predetermined time elapses from a distribution time of a question in step 23, in the case where a predetermined condition is satisfied considering a response situation at that time, a question may not be switched. The response situation may be, for example, a memory ability of a respondent, a progress status of a response, or the like. When the memory ability of the respondent is used as a response situation, the question output controller 12 transmits a question for measuring the memory ability to the terminal 30, and calculates a correct answer rate of the response to the question, as a value indicating the memory ability of the respondent (a memory ability value). The question for measuring the memory ability may be a question about a questionnaire target (a question about a state in the store, etc.), or a question for testing the memory ability (a question causing the respondent to input characters, etc. displayed on the screen for a certain period of time, etc.). When the memory ability value is equal to or larger than a threshold value, the question output controller 12 does not perform a process of switching a question even when a predetermined time elapses from the distribution time of the question. When the progress status of the response is used as a response situation, for example, the question output controller 12 asks the terminal 30 for a scroll amount of a display screen of a question, and acquires the scroll amount. When the scroll amount is equal to or larger than a threshold value, the question output controller 12 does not perform a process of switching a question even when a predetermined time elapses from the distribution time of the question.

In step 15 of the questionnaire request distribution process, the distribution processor 11 may not only request a questionnaire, but also distribute a question in which the shortest response valid time range is set, among plural questions associated with an event (in the example of FIG. 4, a question with a question ID "q001" in which the response valid time range is "less than 3 min") to the terminal 30. In this case, in step 23 of the response acceptance process of FIG. 8, when a question corresponding to a calculated time difference is different from a question in which the shortest response valid time range is set, the question output controller 12 transmits the question corresponding to the time difference.

The event-associated date and time is not limited to that described in the above-described exemplary embodiment, but may include, for example, an event occurrence date and time, a date and time when an event ends, a date and time when a user enters a store, and a date and time when a product or service is provided at the store.

The expected response date and time is not limited to that described in the above-described exemplary embodiment, but may include, for example, a date and time when a notification about a questionnaire is transmitted from the questionnaire distribution device 10 to the terminal, and a date and time when a user performs an operation about a questionnaire using the terminal 30.

Each unit may be implemented by hardware, but may be implemented by a computer program. In this case, the same functions and operations as those in the above-described exemplary embodiment may be implemented by a processor that is operated by a program stored in a memory.

Figure 13:
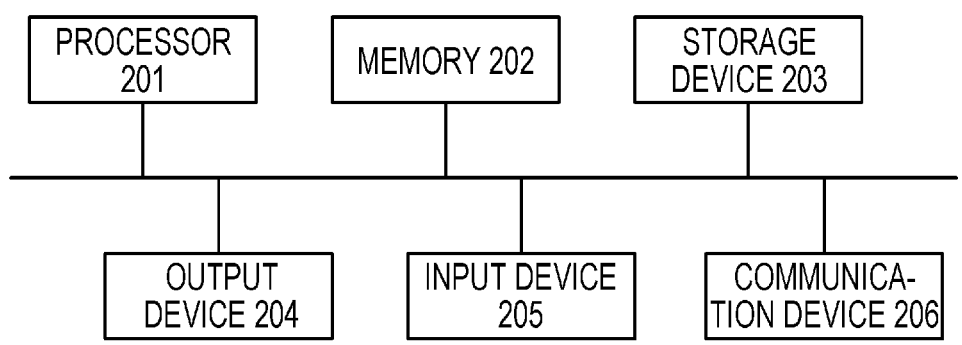
FIG. 13 is a view illustrating an example of a computer operated by a program.

Specifically, as exemplified in FIG. 13, the implementation may be made using a general purpose computer configured with a processor 201, a memory (ROM, RAM, etc.) 202, a storage device (a hard disk, etc.) 203, an output device 204, an input device (a keyboard, a mouse, etc.) 205, and a communication device 206. In this case, in the memory 202 or the storage device 203, a program that performs a process corresponding to the questionnaire distribution device 10 as described above is stored. Then, the processor 201 executes the program stored in the memory 202 or the storage device 203 to implement functions of respective units of the questionnaire distribution device 10.

Second Exemplary Embodiment

In a second exemplary embodiment, plural questions associated with an event are distributed to a terminal, a question according to a time difference between an event-associated date and time and an expected response date and time is specified among the plural questions, and the terminal is instructed to display the specified question. Hereinafter, a configuration different from that of the first exemplary embodiment will be described in detail.

Figure 14:
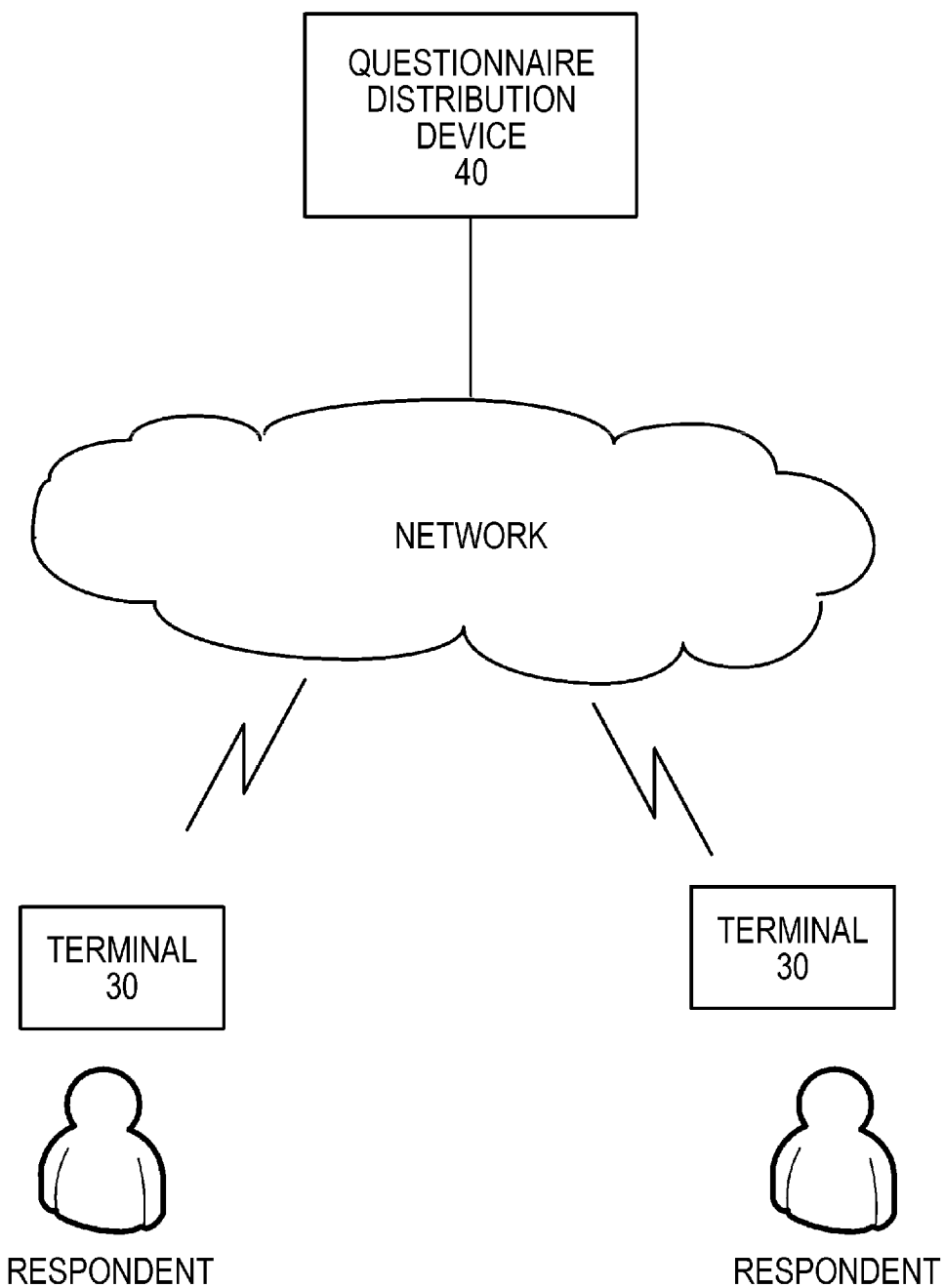
FIG. 14 is a view illustrating a configuration of a questionnaire distribution system according to a second exemplary embodiment.

FIG. 14 is a view illustrating a configuration of a questionnaire distribution system according to a second exemplary embodiment of the present invention.

The questionnaire distribution system according to the second exemplary embodiment includes a questionnaire distribution device 40 and a terminal 30 connected through a network.

Figure 15:
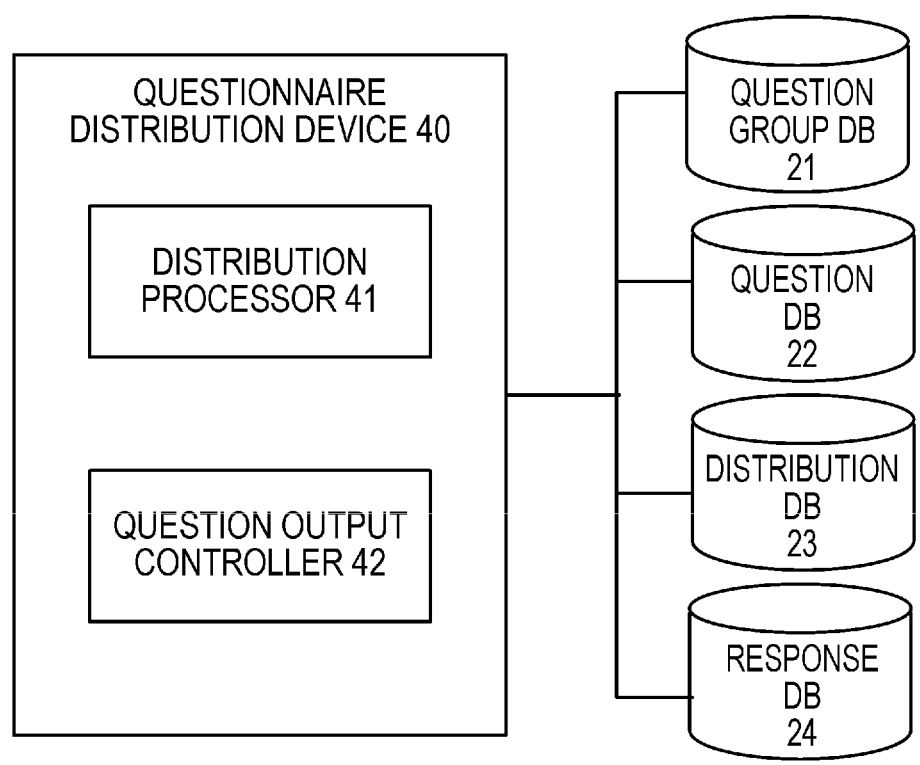
FIG. 15 is a view illustrating an example of a configuration of a questionnaire distribution device according to the second exemplary embodiment.

The configuration of the questionnaire distribution device 40 according to the second exemplary embodiment is exemplified in FIG. 15. The questionnaire distribution device 40 includes a distribution processor 41 and a question output controller 42.

The questionnaire distribution device 40 is connected to a question group DB 21, a question DB 22, a distribution DB 23, and a response DB 24 through a network such as a LAN. The question group DB 21, the question DB 22, the distribution DB 23, and the response DB 24 have the same configurations as those in the first exemplary embodiment. The questionnaire distribution device 40 may include the question group DB 21, the question DB 22, the distribution DB 23, and the response DB 24.

The distribution processor 41 selects question group information satisfying a distribution condition from the question group DB 21, and acquires questions in plural pieces of question information corresponding to the selected question group information, from the question DB 22.

The distribution processor 41 distributes plural questions acquired from the question DB 22 to the terminal 30 of a distribution target person indicated by question group information selected from the question group DB 21. The distribution processor 41 registers information indicating distribution contents, in the distribution DB 23. A distribution form of questions is arbitrary. For example, a notification such as an e-mail affixed with a link for downloading plural questions may be transmitted to the terminal 30 of a target person.

The question output controller 42 specifies question information corresponding to a time difference between an event-associated date and time and an expected response date and time which is a date and time at which a respondent is likely to respond, from plural pieces of question information associated with the event.

The event-associated date and time may be, for example, an occurrence date and time of an event, a distribution date and time of questions about an event, or the like. In the present exemplary embodiment, a distribution date and time of questions about an event is set as an event-associated date and time.

The expected response date and time may be, for example, a date and time at which a respondent tries to start responding to a questionnaire, a date and time at which a request for a response execution is received from the terminal 30, or the like. In the present exemplary embodiment, a date and time at which a response execution request is received from the terminal 30 is set as an expected response date and time. The response execution request includes a user ID of a respondent, and a question group ID of a question to be responded.

When specifying question information corresponding to a time difference between an event-associated date and time and an expected response date and time among plural pieces of question information, the question output controller 42 refers to a response valid time range in each question information to select question information in which the time difference falls within a range indicated by the response valid time range.

The question output controller 42 notifies the terminal 30 of a question ID of question information specified from plural pieces of question information associated with an event, and instructs the terminal 30 to display a question corresponding to the notified question ID. The terminal 30 displays a question corresponding to the question ID notified by the questionnaire distribution device 40 among plural questions distributed previously, and transmits information of a response input for the question to the questionnaire distribution device 40. The question output controller 42 stores the information of the response from the terminal 30 in the response DB 24.

As in the first exemplary embodiment, the terminal 30 is an information processing apparatus including a processor, a memory, a display, an input unit, a communication unit, and the like. The terminal 30 may be, for example, a smartphone, a tablet, a PC, or the like.

The terminal 30 stores plural questions distributed from the questionnaire distribution device 40. The terminal 30 transmits a response execution request to the questionnaire distribution device 40 according to a predetermined operation for a questionnaire response by a respondent. Accordingly, a question corresponding to a question ID notified by the questionnaire distribution device 40 is displayed. The terminal 30 transmits information of a response to the displayed question, which is input from a user, to the questionnaire distribution device 40.

Figure 16:
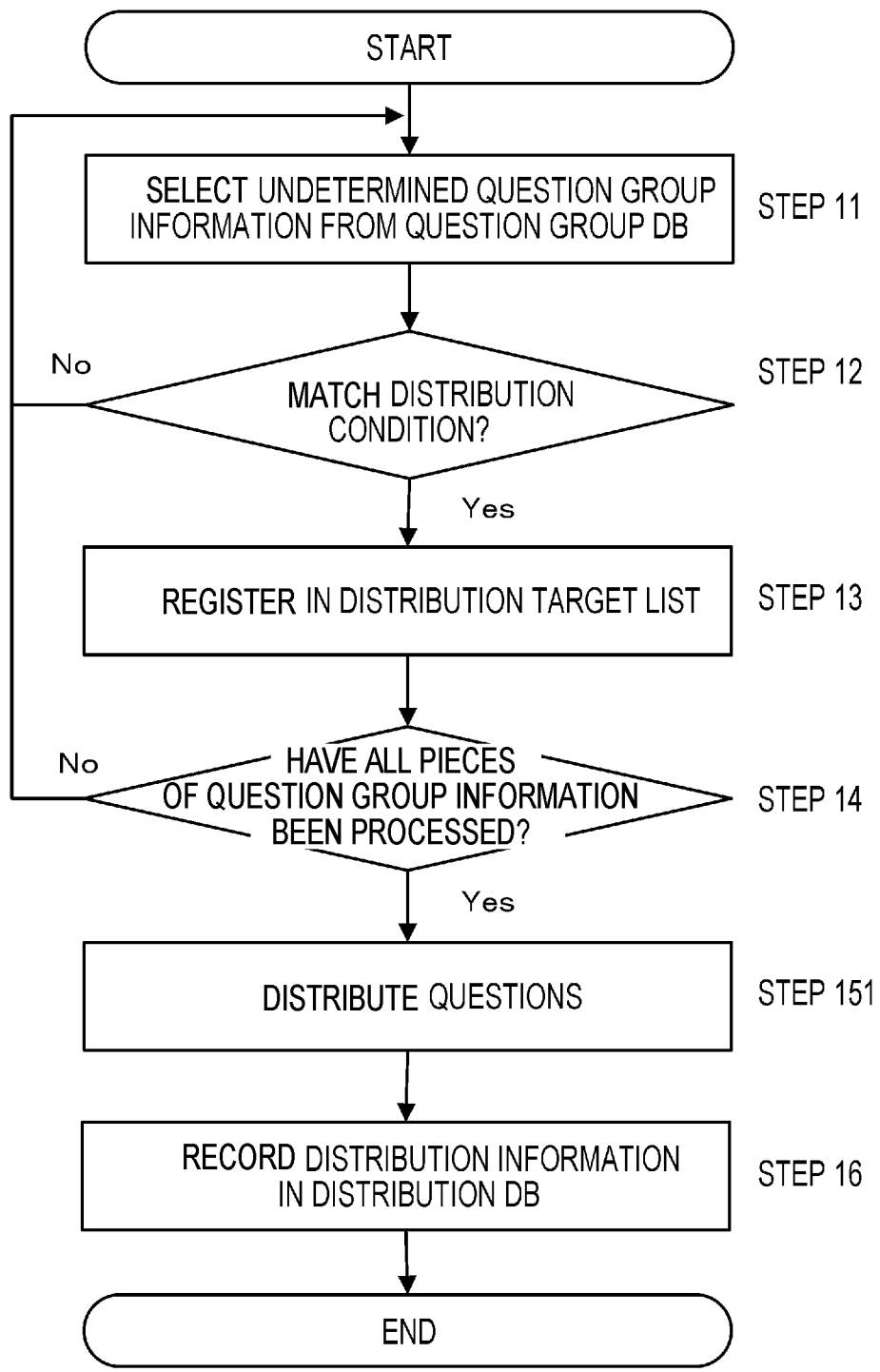
FIG. 16 is a flow chart for explaining a question distribution process of the second exemplary embodiment.

FIG. 16 illustrates a flow chart of a question distribution process in which the questionnaire distribution device 40 distributes a question group. The processes from step 11 to step 14 and the process in step 16 in the question distribution process of the second exemplary embodiment are the same as those in the first exemplary embodiment. After step 14, the distribution processor 41 acquires plural questions corresponding to the question group information registered in the distribution target list, from the question DB 22, and distributes the plural questions to the terminal 30 of a distribution target person indicated by the question group information (step 151). After the plural questions are distributed, the distribution processor 11 records distribution information in the distribution DB 23 (step 16).

Figure 17:
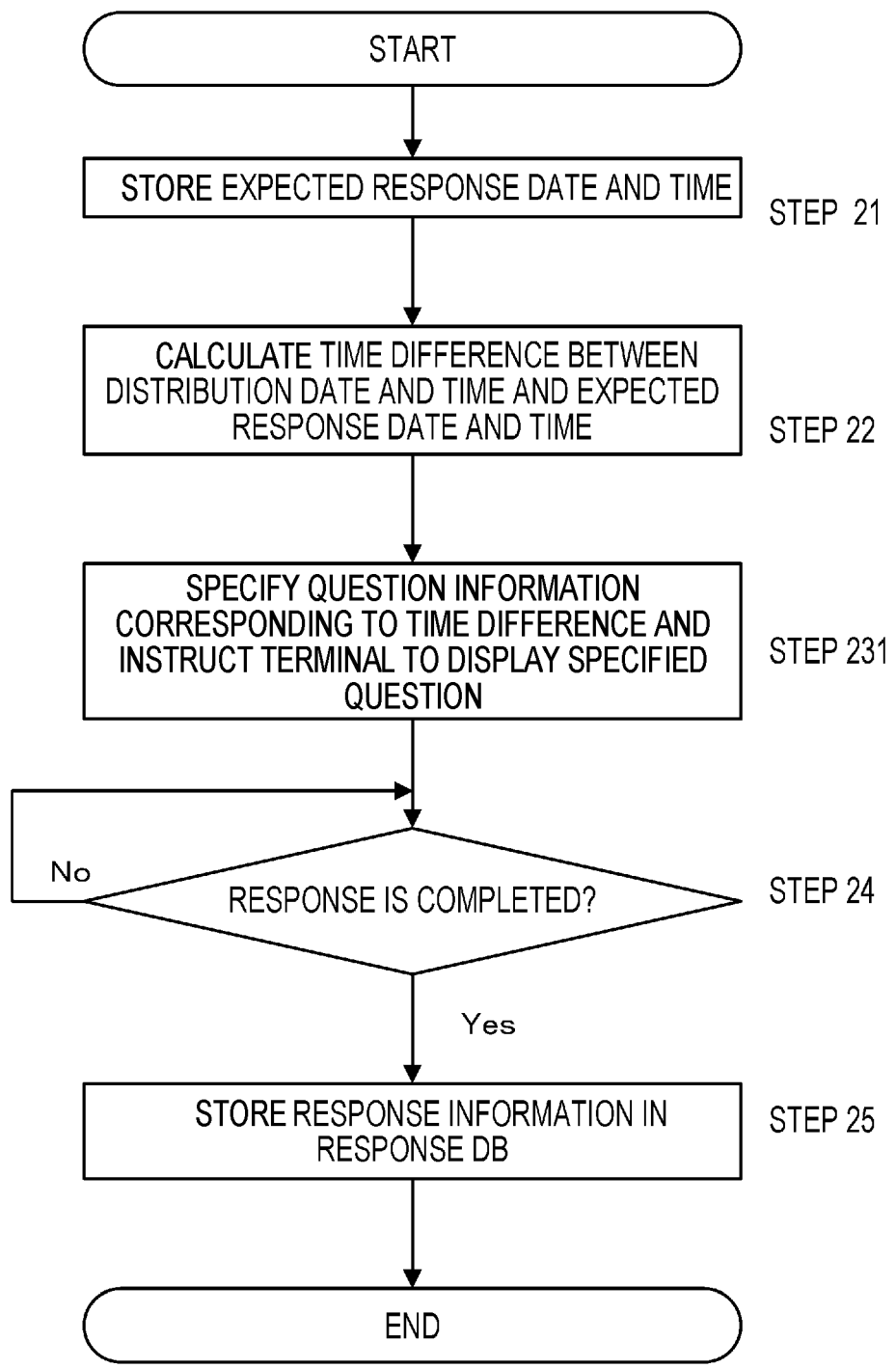
FIG. 17 is a flow chart for explaining a response acceptance process of the second exemplary embodiment.

FIG. 17 illustrates a flow chart of a response acceptance process in which the questionnaire distribution device 40 accepts response information. The processes from step 21 to step 22 and the processes from step 24 to step 25 in the response acceptance process of the second exemplary embodiment are the same as those in the first exemplary embodiment. After step 22, the question output controller 42 selects question information corresponding to the time difference calculated in step 22, from plural pieces of question information corresponding to the question group ID included in the response execution request, notifies the terminal 30 of a question ID of the selected question information, and instructs the terminal 30 to display a question corresponding to the notified question ID (step 231).

The terminal 30 displays the question corresponding to the presented question ID. When a response input for the displayed question is completed, the terminal 30 transmits information of the input response to the questionnaire distribution device 40.

Upon receiving the information of the response from the terminal 30 (step 24), the question output controller 42 stores response information including the information of the response and the response start time acquired in step 21, in the response DB 24 (step 25).

Figure 18:
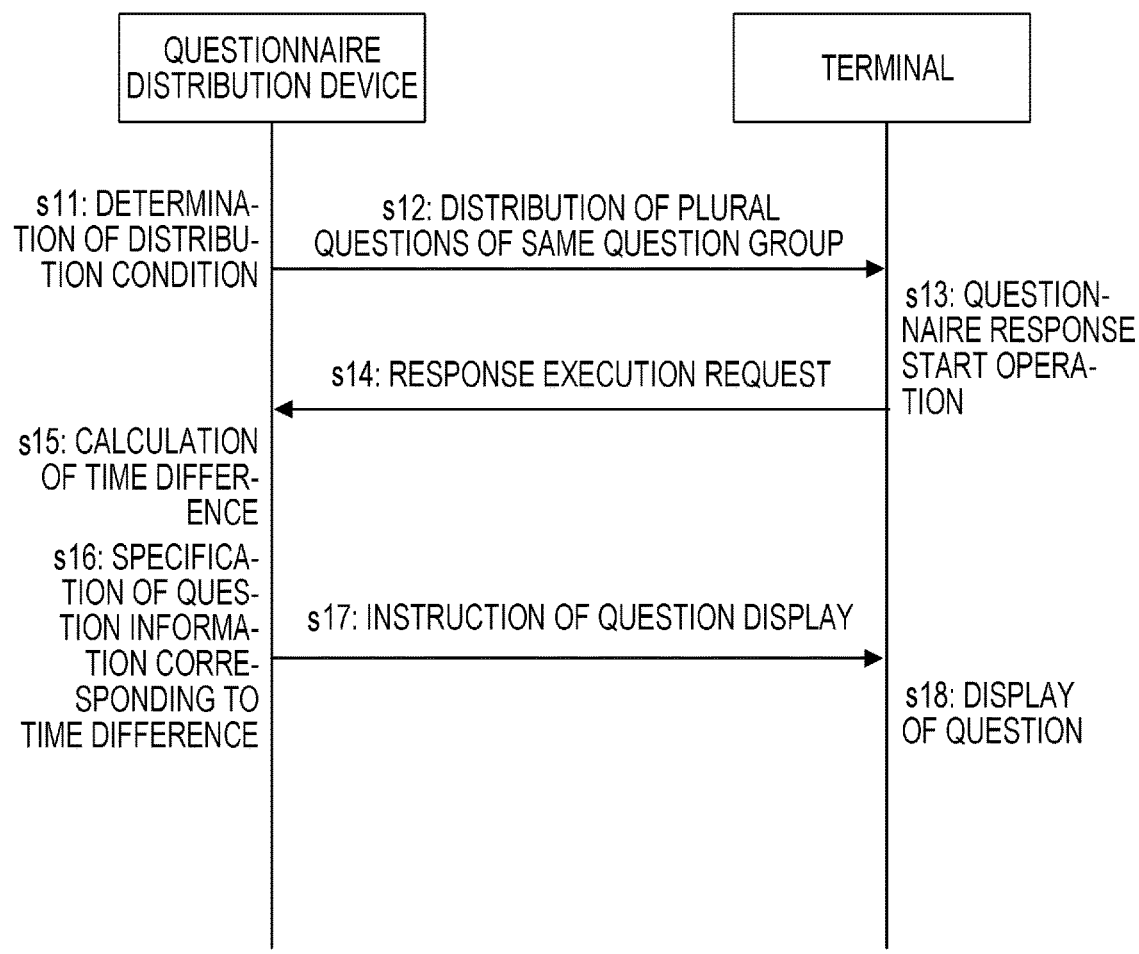
FIG. 18 is a sequence diagram for explaining an operation in the second exemplary embodiment.

Thereafter, as a specific example, descriptions will be made on an operation of the present exemplary embodiment in a case where a question associated with a certain event "visit to store A" is distributed with reference to a sequence diagram of FIG. 18.

For example, each of a user with a user ID "X001" and a user with a user ID "X003" visits a store A and performs a questionnaire member registration from his/her terminal 30. Accordingly, for example, the distribution processor 41 of the questionnaire distribution device 40 registers "X001" and "X003" in a distribution target person of the question group DB 21, in question group information with a question group ID "g001" as exemplified in FIG. 3.

When a scheduled distribution date and time set in the question group information with the question group ID "g001" in the question group DB 21 comes, the distribution processor 41 of the questionnaire distribution device 40 determines that the question group information with the question group ID "g001" matches a distribution condition (s11), reads questions of plural pieces of question information corresponding to the question group information (questions with question IDs "q001," "q002," and "q003" exemplified FIG. 3) from the question DB 22, and distributes the questions to the terminals 30 of the user IDs "X001" and "X003" (s12). The notification displayed for distributing the plural questions to the terminal 30 of each of the user IDs "X001" and "X003" is exemplified in FIG. 10.

The user with the user ID "X001" starts responding to a questionnaire, for example, immediately after the questions are distributed (s13). With the start of the questionnaire response, the terminal 30 of the user ID "X001" transmits a response execution request to the questionnaire distribution device 40 (s14).

The question output controller 42 of the questionnaire distribution device 40 calculates a time difference "1 min 50 sec" between a reception time (for example, Sep. 20, 2016, 10:02:10) set as an expected response time, when the response execution request is received from the terminal 30 of the user with the user ID "X001," and a distribution time "Sep. 20, 2016, 10:00:20" corresponding to the question group ID "g001" (see, for example, FIG. 3) (s15).

The question output controller 42 selects question information having a response valid time range corresponding to the time difference "1 min 50 sec," among plural pieces of question information corresponding to the question group ID "g001" included in the response execution request (s16). Since the response valid time range of the question information with a question ID "q001" is "less than 3 min" in the question information of FIG. 4, the question information with the question ID "q001" is selected. As exemplified in FIG. 4, a question with the question ID "q001" selected herein is a question in which the number of characters is small in a question text, and a response item indicates a free description.

The question output controller 42 transmits the question ID "q001" of the specified question information to the terminal 30 of the user with the user ID "X001," and instructs the terminal 30 to display the question with the question ID "q001" (s17). Accordingly, the terminal 30 of the user with the user ID "X001" displays the question with the question ID "q001" (s18).

The user with the user ID "X003" starts responding to a questionnaire, for example, two hours after the questions are distributed. With the start of the questionnaire response, the terminal 30 of the user ID "X003" transmits a response execution request to the questionnaire distribution device 40 (s14).

The question output controller 42 of the questionnaire distribution device 40 calculates a time difference "2 hours" between a reception time (for example, Sep. 20, 2016, 12:00:20) set as an expected response time, when the response execution request is received from the terminal 30 of the user with the user ID "X003," and a distribution time "Sep. 20, 2016, 10:00:20" corresponding to the question group ID "g001" (see, for example, FIG. 3) (s15).

The question output controller 42 selects question information having a response valid time range corresponding to the time difference "2 hours," among plural pieces of question information corresponding to the question group ID "g001" included in the response execution request (s16). Since the response valid time range of the question information with a question ID "q003" is "60 min or more, less than 1440 min" in the question information of FIG. 4, question information with the question ID "q003" is selected. As exemplified in FIG. 4, a question with the question ID "q003" acquired herein is a question in which the number of characters is large in a question text, and the number of response items is small.

The question output controller 42 notifies the terminal 30 of the user with the user ID "X003" about the question ID "q003," and instructs the terminal 30 to display the question with the question ID "q003" (s17). Accordingly, the terminal 30 of the user with the user ID "X003" displays the question with the question ID "q003" (s18).

Questions displayed on the terminal 30 of the user ID "X001" and the terminal 30 of the user ID "X003" are exemplified in FIG. 11. Since the user ID "X003" starts a response after a long time has elapsed, as compared to the user ID "X001," an easier question to respond than a question displayed for the user ID "X001" is displayed on the terminal of the user ID "X003."

Third Exemplary Embodiment

In the third exemplary embodiment, descriptions will be made on an example in which a question to be presented to a terminal of a respondent is acquired using a time difference between an event-associated date and time and an expected response date and time and a difference between an event-associated position and a respondent's position. The third exemplary embodiment is different from the first exemplary embodiment in that when a question to be displayed on a terminal is acquired among plural questions associated with an event, a difference between an event-associated position and a respondent's position is used.

Figure 19:
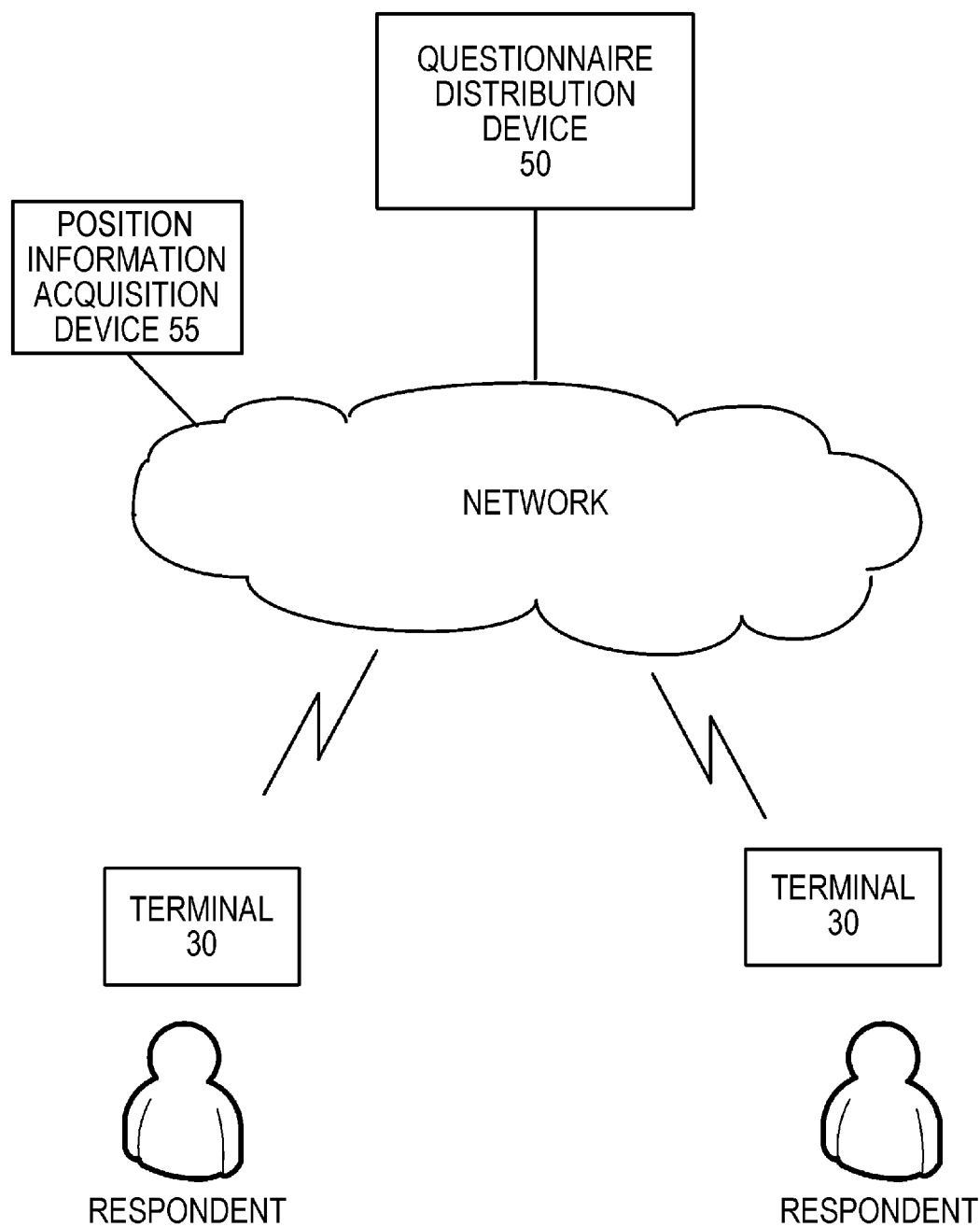
FIG. 19 is a view illustrating a configuration of a questionnaire distribution system according to a third exemplary embodiment.

FIG. 19 is a view illustrating a configuration of a questionnaire distribution system according to the third exemplary embodiment.

The questionnaire distribution system according to the third exemplary embodiment includes a questionnaire distribution device 50, a position information acquisition device 55, and a terminal 30 which are connected through a network.

The position information acquisition device 55 is a device that acquires position information of the terminal 30. The method of acquiring the position information of the terminal 30 is arbitrary. For example, when the terminal 30 in the vicinity is detected through a wireless communication, predetermined position information may be given to the terminal 30, and global positioning system (GPS) information may be acquired from the terminal 30. The position information acquisition device 55 transmits the acquired position information of the terminal 30 together with information for identifying the terminal 30 or a user to the questionnaire distribution device 50 periodically. The position information acquisition device 55 is disposed in a distributed manner in, for example, plural areas.

Figure 20:
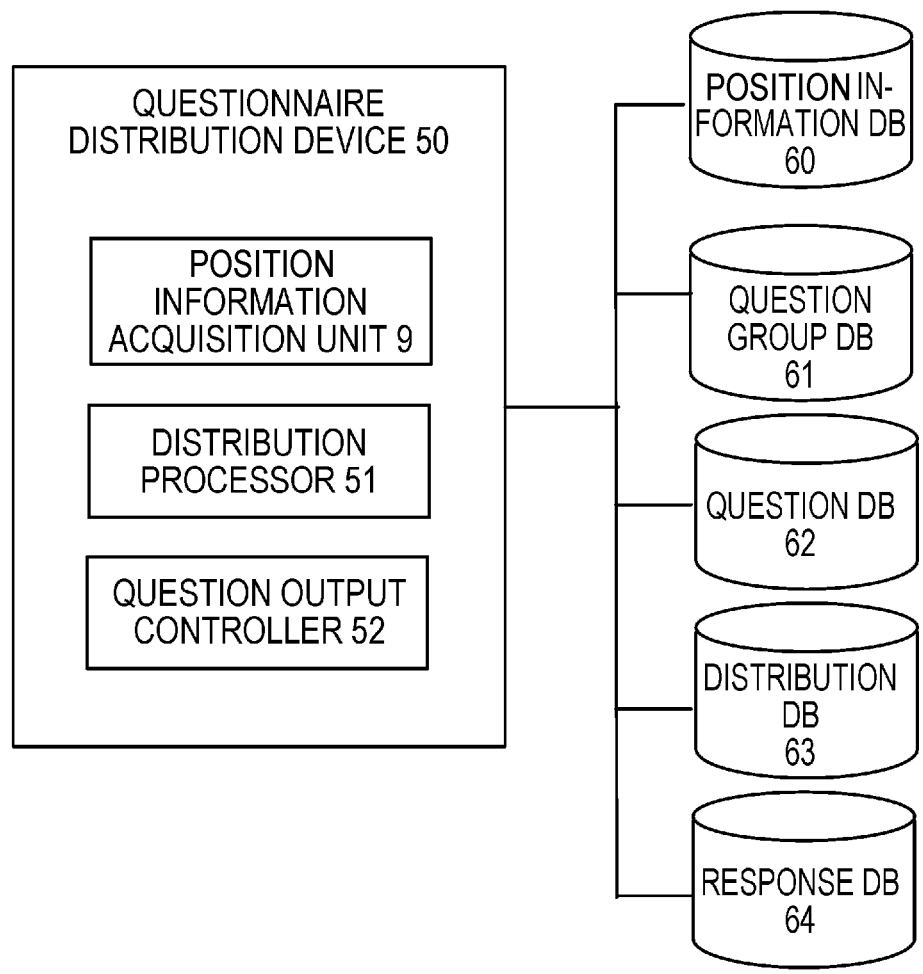
FIG. 20 is a view illustrating an example of a configuration of a questionnaire distribution device according to the third exemplary embodiment.

The configuration of the questionnaire distribution device 50 according to the third exemplary embodiment is exemplified in FIG. 20. The questionnaire distribution device 50 includes a position information acquisition unit 9, a distribution processor 51, and a question output controller 52.

The questionnaire distribution device 50 is connected to a position information DB 60, a question group DB 61, a question DB 62, a distribution DB 63, and a response DB 64 through a network such as a LAN. The questionnaire distribution device 50 may include the position information DB 60, the question group DB 61, the question DB 62, the distribution DB 63, and the response DB 64.

The position information acquisition unit 9 receives position information of the terminal 30 from the position information acquisition device 55, and stores the position information in the position information DB 60. As the position information, an identifier given to an area may be used, or position coordinates may be used.

As exemplified in FIG. 21, information stored in the position information DB 60 includes data items (for example, a position information ID, a detection start date and time, a detection end date and time, a detected user ID indicating a detected user, a detection position (position information), etc.). The position information acquisition unit 9 records a reception time of position information on the same user present in the same area in the "detection end time," when the position information is received within a predetermined time (substantially the same as a transmission timing of the position information of the position information acquisition device 55).

The distribution processor 51 selects question group information satisfying a distribution condition from the question group DB 61.

As exemplified in FIG. 22, question group information stored in the question group DB 61 includes data items (for example, a question group ID, a question group name, a distribution area at arrival, a distribution area at departure, a stay time distribution area, a stay time, etc.).

As exemplified in FIG. 23, question information stored in the question DB 62 includes data items (for example, a question ID, a question group ID, a question text, a response item of a question, a response valid time range, a response valid moving distance range, etc.). In the present exemplary embodiment, on question information of the same group ID stored in the question DB 62, a response valid time range corresponding to a longer time and a response valid moving distance range corresponding to a longer distance are set in the order of question with easy-to-respond contents (in the order of . . . q003, q002, q001 in the example of FIG. 23).

The distribution processor 51 distributes a questionnaire request notification to the terminal 30 of a distribution target person indicated by question group information selected from the question group DB 61 based on the distribution condition. The distribution processor 51 registers information indicating distribution contents in the distribution DB 63.

As exemplified in FIG. 24, distribution information stored in the distribution DB 63 includes data items (for example, a distribution ID, a distribution date and time, a distribution position, a question group ID of a distributed question, a distribution target list, etc.). In the distribution position, coordinates within an area used as a distribution condition (one or more of the distribution area at arrival, the distribution area at departure, and the stay time distribution area) are recorded.

The question output controller 52 acquires a question of question information corresponding to a time difference between an event-associated date and time and an expected response date and time and a difference between an event-associated position and a respondent's position, from plural pieces of question information associated with the event. The event-associated position may be, for example, an occurrence position of an event, a position at which a question about an event is distributed, or the like. In the present exemplary embodiment, the position at which a question about an event is distributed is set as an event-associated position.

The respondent's position may be, for example, a position at which a respondent makes a response using the terminal 30, a position at which the terminal 30 transmits a response execution request, or the like. In the present exemplary embodiment, the position at which the terminal 30 transmits a response execution request is set as a respondent's position.

The response execution request transmitted from the terminal 30 includes a user ID of a respondent, a question group ID of a question to be responded, and a response position (position information of the terminal 30). The method of acquiring the position information by the terminal 30 is arbitrary, and for example, a GPS, radio waves, an IP address, or the like may be used.

When acquiring a question corresponding to a time difference between an event-associated date and time and an expected response date and time and a difference between an event-associated position and a respondent's position among plural pieces of question information, the question output controller 52 refers to a response valid time range and a response valid moving distance range in each question information to select a question of question information in which the time difference falls within a range indicated by the response valid time range, and a question of question information in which the position difference falls within a range indicated by the response valid moving distance range.

The question output controller 52 distributes a question acquired from the plural pieces of question information associated with an event to the terminal 30. The terminal 30 displays the distributed question, and transmits information of a response input for the question to the questionnaire distribution device 50. The question output controller 52 stores the information of the response from the terminal 30 in the response DB 64.

As exemplified in FIG. 25, response information stored in the response DB 64 includes data items (for example, a response ID for identifying a response, a response start time, a response end time, a respondent ID indicating a user ID of a respondent, a question ID, a response item indicating response contents, a corresponding distribution ID, etc.). The response start time may be, for example, a time when information of a response is received from the terminal 30, a response input time recorded at the terminal 30 side, or the like.

A question distribution process in which the questionnaire distribution device 50 distributes a question group is the same as that in the question distribution process (FIG. 7) of the first exemplary embodiment except for the determination process in step 12 and the registration process of distribution information in step 16, and thus, steps 121 and 161 executed instead of steps 12 and 16, respectively, will be described.

In step 121, the distribution processor 51 determines whether the selected question group information matches a predetermined distribution condition.

For example, the distribution condition in the present exemplary embodiment is as follows.

(1) when a certain area is set in the "distribution area at arrival" of the question group information, position information having the set area as the "detection area" is registered in the position information DB 60.

(2) when a certain area is set in the "distribution area at departure" of the question group information, position information in which the set area is the "detection area," and more than a predetermined time elapses from the "detection end time" (for example, when the position information acquisition device 55 transmits the position information every 3 minutes, the time may exceed 3 min) is registered in the position information DB 60.

(3) when a certain area is set in the "stay time distribution area" of the question group information, position information in which the set area is the "detection area," and a difference between the "detection end time" and the "detection start time" is equal to or greater than the "stay time" of the question group information is registered in the position information DB 60.

When it is determined that the selected question group information matches the distribution condition, the distribution processor 51 registers the selected question group information in a distribution target list.

In step 161, after distributing a question, the distribution processor 51 records the distribution information including a distribution position, in the distribution DB 63.

Figure 26:
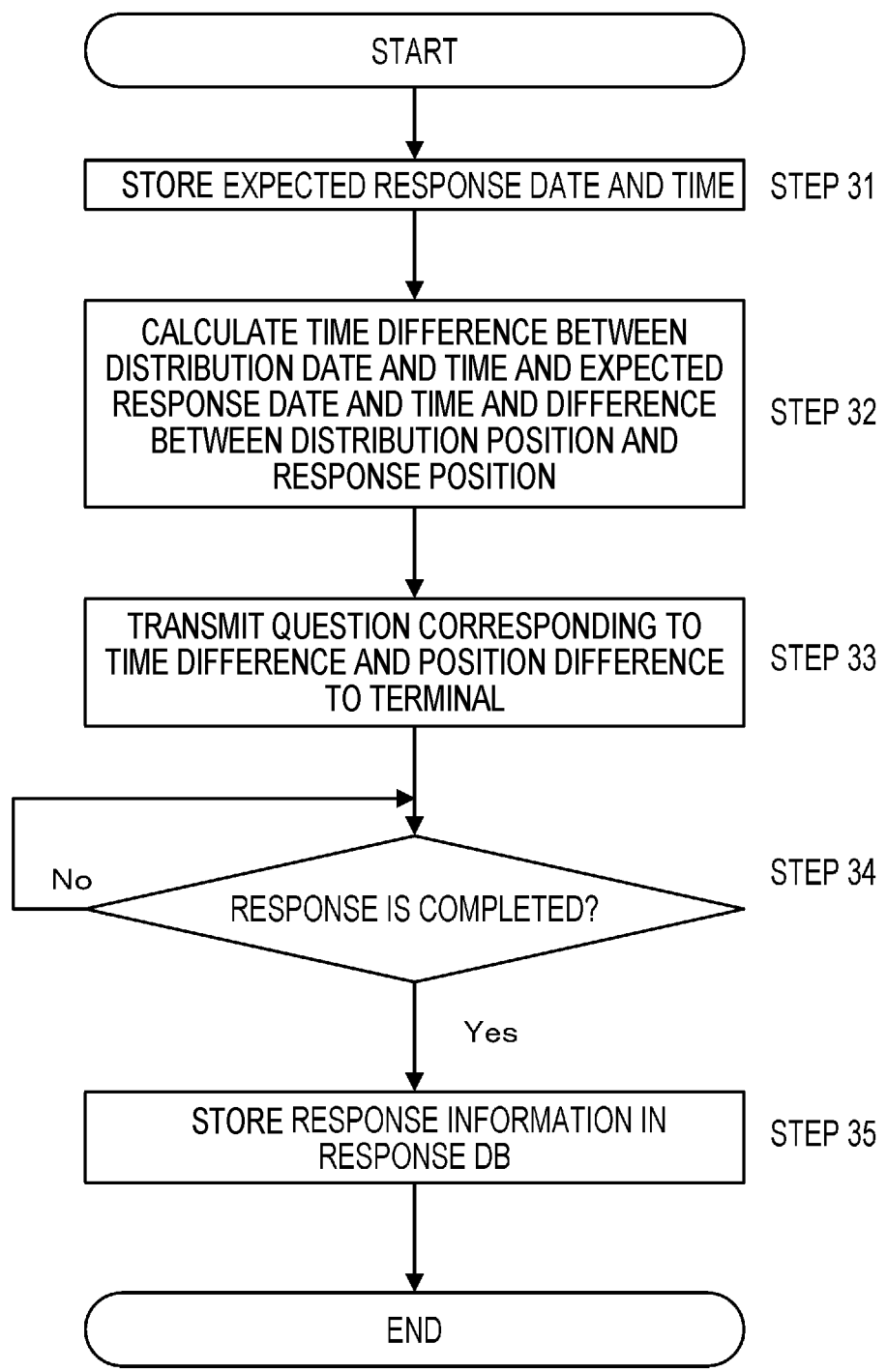
FIG. 26 is a flow chart for explaining a response acceptance process of the third exemplary embodiment.

Descriptions will be made on a response acceptance process in which the questionnaire distribution device 50 accepts response information, with reference to a flow chart of FIG. 26.

Upon receiving a response execution request from the terminal 30, the question output controller 52 stores the reception time as an expected response date and time in a predetermined storage area (step 31).

The question output controller 52 acquires a distribution date and time and a distribution position corresponding to a question group ID included in the response execution request, from the distribution DB 63. The question output controller 52 calculates a time difference between the acquired distribution date and time and the expected response date and time, and a difference between the acquired distribution position and the response location (step 32).

The question output controller 52 acquires a question in question information corresponding to the time difference and the position difference calculated in step 32, among plural pieces of question information corresponding to the question group ID included in the response execution request, and transmits the acquired question to the terminal 30 (step 33).

The terminal 30 displays a question corresponding to the transmitted question. When a response input for the displayed question is completed, the terminal 30 transmits information of the input response to the questionnaire distribution device 50.

Upon receiving the information of the response from the terminal 30 (step 34), the question output controller 52 considers the reception time as a response end time, and stores response information including the received information of the response and the response end time and a response start time, in the response DB 64 (step 35).

Thereafter, as a specific example, descriptions will be made on an operation of the present exemplary embodiment in a case where a question associated with a certain event "visit store A" is distributed.

For example, when each of a user with a user ID "X023," a user with a user ID "X046," and a user with a user ID "X092" visits a store A, the position information acquisition device 55 disposed in an area (an area A155) of the store A transmits position information on the terminal 30 of the user with the user ID "X023," the terminal 30 of the user with the user ID "X046," and the terminal 30 of the user with the user ID "X092" to the questionnaire distribution device 50.

The position information acquisition unit 9 stores position information corresponding to the user ID "X023," the user ID "X046," and the user ID "X092," in the position information DB 60.

The distribution processor 51 determines that the question group information of a question group ID "g001" in the question group DB 61 matches a distribution condition, "when a certain area is set in the 'distribution area at arrival,' position information having the set area as the 'detection area' is registered in the position information DB 60," and distributes a questionnaire request notification corresponding to the question group information to the terminal 30 of the user with the user ID "X023," the terminal 30 of the user with the user ID "X046," and the terminal 30 of the user with the user ID "X092."

The user with the user ID "X023" starts responding to a questionnaire on the spot, for example, immediately after the questionnaire request notification is distributed. With the start of the questionnaire response, the terminal 30 of the user ID "X023" transmits a response execution request to the questionnaire distribution device 50.

The question output controller 52 of the questionnaire distribution device 50 calculates a time difference "1 min 48 sec" between a reception time (for example, Sep. 5, 2016, 10:26:50) set as an expected response time, when the response execution request is received from the terminal 30 of the user with the user ID "X023," and a distribution time "Sep. 5, 2016, 10:25:02," corresponding to the question group ID "g001" (see, for example, FIG. 24). The question output controller 52 calculates a difference (assumed to be 0.5 km in this example) between a distribution position of a question, and a location at which the response execution request is transmitted.

The question output controller 52 specifies question information with a question ID "q001" having a response valid time range corresponding to the time difference "1 min 48 sec" and question information with a question ID "q001" having a response valid moving distance range corresponding to the position difference "0.5 km," among plural pieces of question information corresponding to the question group ID "g001" included in the response execution request. In this example, since the pieces of specified question information coincide with each other, the question output controller 52 acquires the question in the question information with the question ID "q001." The question output controller 52 transmits the question with the question ID "q001" to the terminal 30 of the user with the user ID "X023." Accordingly, the terminal 30 of the user with the user ID "X023" displays the question with the question ID "q001."

The user with the user ID "X046" starts responding to a questionnaire, for example, two hours after the questionnaire request notification is distributed, at a place away from the store A. With the start of the questionnaire response, the terminal 30 of the user ID "X046" transmits a response execution request to the questionnaire distribution device 50.

The question output controller 52 of the questionnaire distribution device 50 calculates a time difference "two hours" between a reception time (for example, Sep. 5, 2016, 12:25:02) set as an expected response time, when the response execution request is received from the terminal 30 of the user with the user ID "X046," and a distribution time "Sep. 5, 2016, 10:25:02" corresponding to the question group ID "g001" (see, for example, FIG. 24). The question output controller 52 calculates a difference (assumed to be 3 km in this example), between a distribution position of a question, and a location at which the response execution request is transmitted.

The question output controller 52 specifies question information (a question ID "q003") having a response valid time range corresponding to the time difference "two hours" and question information (a question ID "q002") having a response valid moving distance range corresponding to the position difference "3 km," among plural pieces of question information corresponding to the question group ID "g001" included in the response execution request. In this example, the pieces of specified question information do not match each other. As described above, when the question information corresponding to the time difference does not match the question information corresponding to the position difference, the question information is selected based on a predetermined priority order. When in the priority order, a time difference is set as No. 1, and a position difference is set as No. 2, question information corresponding to the time difference is selected. The question information may be selected in the order of easiness of responding.

The question output controller 52 transmits the question in the selected question information to the terminal 30 of the user with the user ID "X046." Accordingly, the terminal 30 of the user with the user ID "X046" displays the received question.

Modification of Third Exemplary Embodiment

Figure 27:
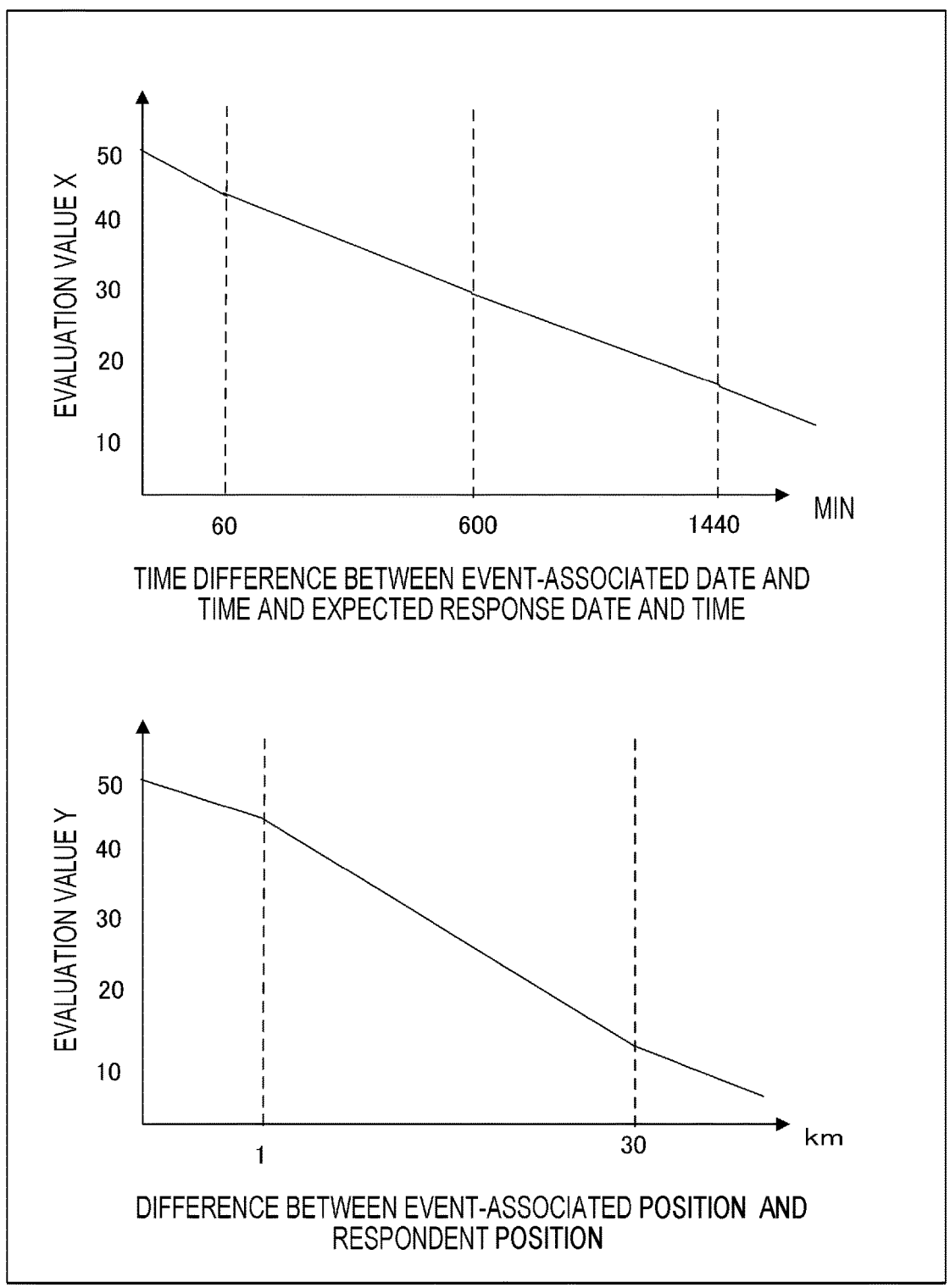
FIG. 27 is a view for explaining a method of obtaining an evaluation value x and an evaluation value y.

A question to be presented to a terminal of a respondent may be specified integrally using a time difference between an event-associated date and time and an expected response date and time and a difference between an event-associated position and a respondent's position. In this example, the question output controller 52 obtains a respondent score obtained by adding an evaluation value x corresponding to a time difference between an event-associated date and time and an expected response date and time, and an evaluation value y corresponding to a difference between an event-associated position and a respondent's position. FIG. 27 illustrates an example of a relationship between the time difference and the evaluation value x, and a relationship between the position difference and the evaluation value y, which are referred to when the evaluation value x and the evaluation value y are obtained. The question output controller 52 acquires a question corresponding to the respondent score from a question DB as exemplified in FIG. 28, and transmits the acquired question to the terminal 30.

When a question notified to the terminal 30 is selected from plural questions, a moving route of a respondent may be taken into consideration. For example, an environmental score z based on a relationship between a noise and a memory ability is set for each area where the position information acquisition device 55 is disposed. As the environmental score z, a high score is set for a noisy area, and a low score is set for a quiet area. The question output controller 12 obtains a respondent score by adding a score x corresponding to a time difference between a distribution date and time and an expected response date and time, a score y corresponding to a difference between a distribution position and a response position, and an environmental score z set for an area. In each question information of the question information DB 62, a range of a respondent score is set such that an easier question to respond is selected as the respondent score increases. The question output controller 52 selects a question corresponding to the acquired respondent score.

In the third exemplary embodiment, a question to be presented to a terminal of a respondent is acquired using a time difference between an event-associated date and time and an expected response date and time and a difference between an event-associated position and a respondent's position. However, a question to be presented to a terminal of a respondent may be acquired by using only a difference between an event-associated position and a respondent's position without using a time difference between an event-associated date and time and an expected response date and time. In this case, the question output controller 52 acquires a question of question information having a response valid moving distance range corresponding to a difference between an event-associated position and a respondent's position, among plural pieces of question information corresponding to a question group ID included in a response execution request from the terminal 30, and transmits the acquired question to the terminal 30.

Fourth Exemplary Embodiment

In the fourth exemplary embodiment, descriptions will be made on an example in which a question output controller of a questionnaire distribution device selects a question including at least one of an image or a sound and transmits the question to the terminal 30 when a time difference between an event-associated date and time and an expected response date and time becomes larger than a threshold value. Since the configurations except for the question DB 22 are the same as those in the first exemplary embodiment, a different configuration will be described in detail.

As exemplified in FIG. 28, question information stored in a question DB of the fourth exemplary embodiment includes data items (for example, a question ID, a question group ID, a question text, a response item, an image file name, a response valid time range, etc.). In the present exemplary embodiment, an image is used for the response item. The question DB also stores data of the image used for the response item.

For example, referring to FIG. 29, plural pieces of question information "q001" and "q002" belonging to a question group "g001" are registered in the question DB. In the question information "q001," a question including a question text "please write the menu you had" and a response item "free description" is set. In the question information "q002," a question including a question text "please choose the menu you had from the followings" and a response item "photo 01, photo 02, photo 03, not in these photos" is set.

In the present exemplary embodiment, in question information of the same group ID stored in the question DB, a question in which multimedia data such as an image is used for a response item is selected when a time difference between an event-associated date and time and an expected response date and time becomes larger than a predetermined value. In the example of question information of FIG. 29, a question including an image of a photograph is selected when a time difference is 3 min or more.

Figure 30:
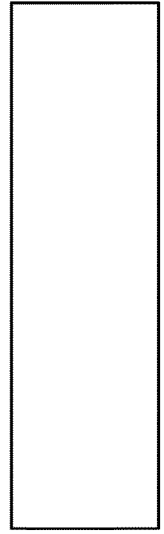
FIG. 30 is a display example of a question.

FIG. 30 illustrates a screen example of the terminal 30 when a response is made 2 min after a distribution date and time and a screen example of the terminal 30 when a response is made 50 min after a distribution date and time, in the case where the question information of FIG. 29 is registered. On the terminal 30 in the case where a response is made 50 min after a distribution date and time, a question using an image is displayed.

The multimedia data used for a question is not limited to a still image, but may be a moving image, a music, or the like. When a moving image is used, for example, as exemplified in FIG. 31, question information stored in the question DB includes data items (for example, a question ID, a question group ID, a question text, a response item, a moving image file name, a response valid time range, etc.). In this case, the question DB 22 also stores data of a moving image used for the response item.

Figure 32:
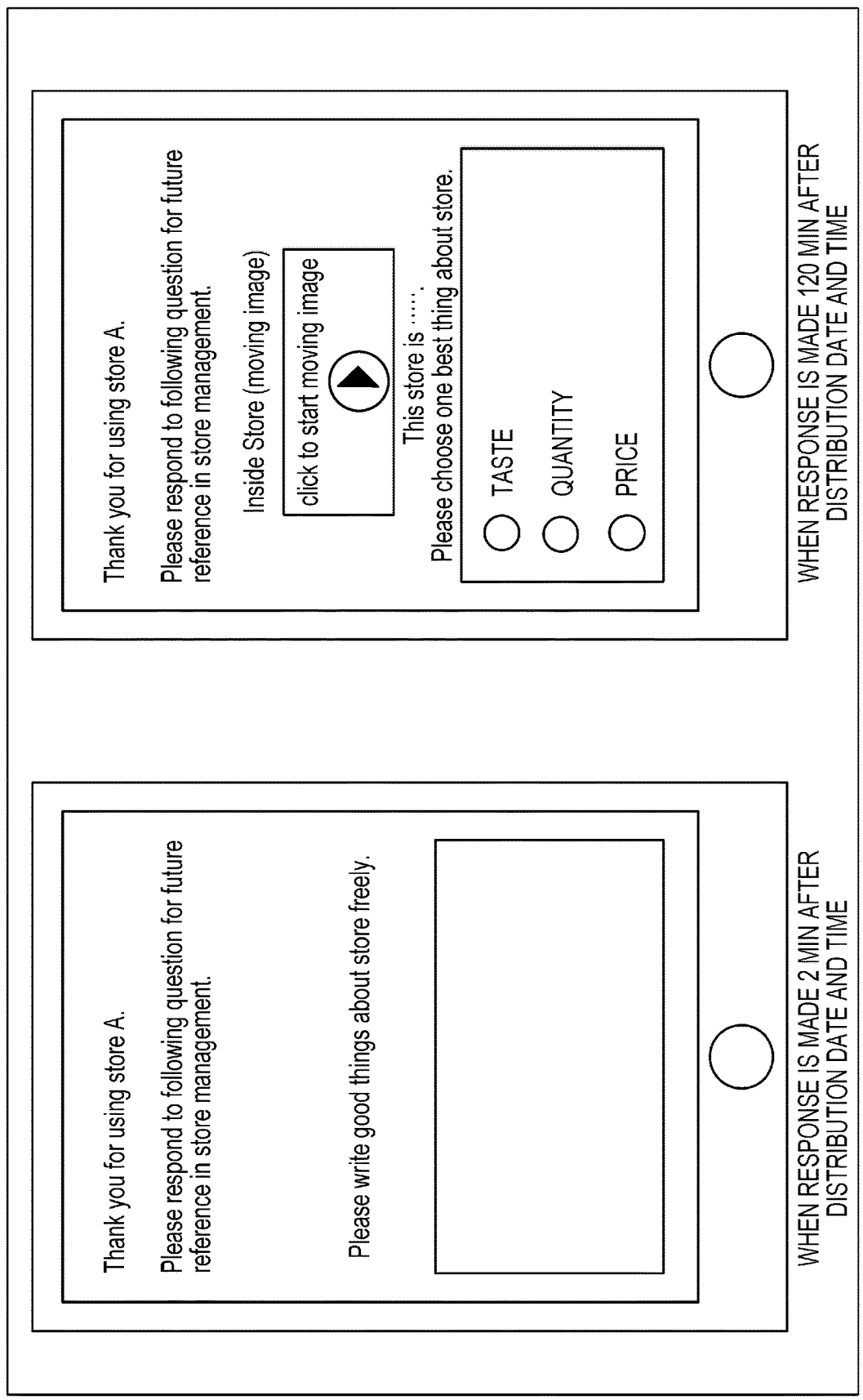
FIG. 32 is a display example of a question.

FIG. 32 illustrates a screen example of the terminal 30 when a response is made 2 min after a distribution date and time and a screen example of the terminal 30 when a response is made 120 min after a distribution date and time in the case where the question information of FIG. 31 is registered. On the terminal 30 in the case where a response is made 120 min after a distribution date and time, a question using a moving image is displayed.

Fifth Exemplary Embodiment

Figure 33:
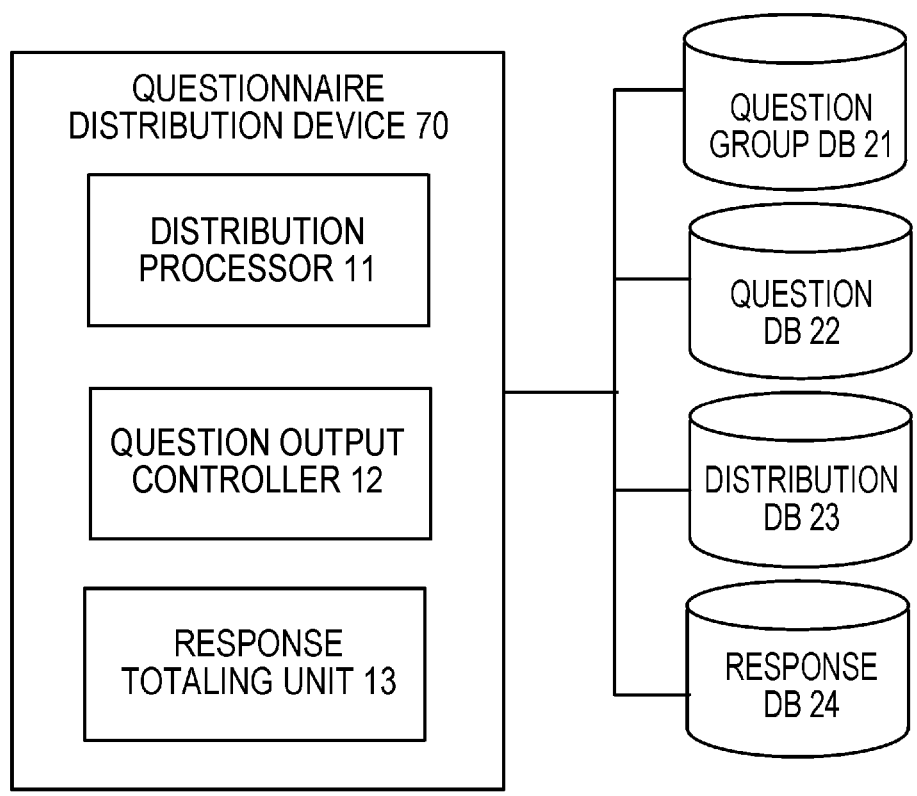
FIG. 33 is a view illustrating an example of a configuration of a questionnaire distribution device according to a fifth exemplary embodiment.

A questionnaire distribution device according to a fifth exemplary embodiment further includes a response aggregating unit that aggregates responses to questions output from a question output controller to the terminal 30 based on a time difference between an event-associated date and time and an expected response date and time. FIG. 33 illustrates a configuration of a questionnaire distribution device 70 according to the fifth exemplary embodiment. Since the configurations except for the response aggregating unit 13 are the same as those in the first exemplary embodiment, a different configuration will be described.

Figure 34:
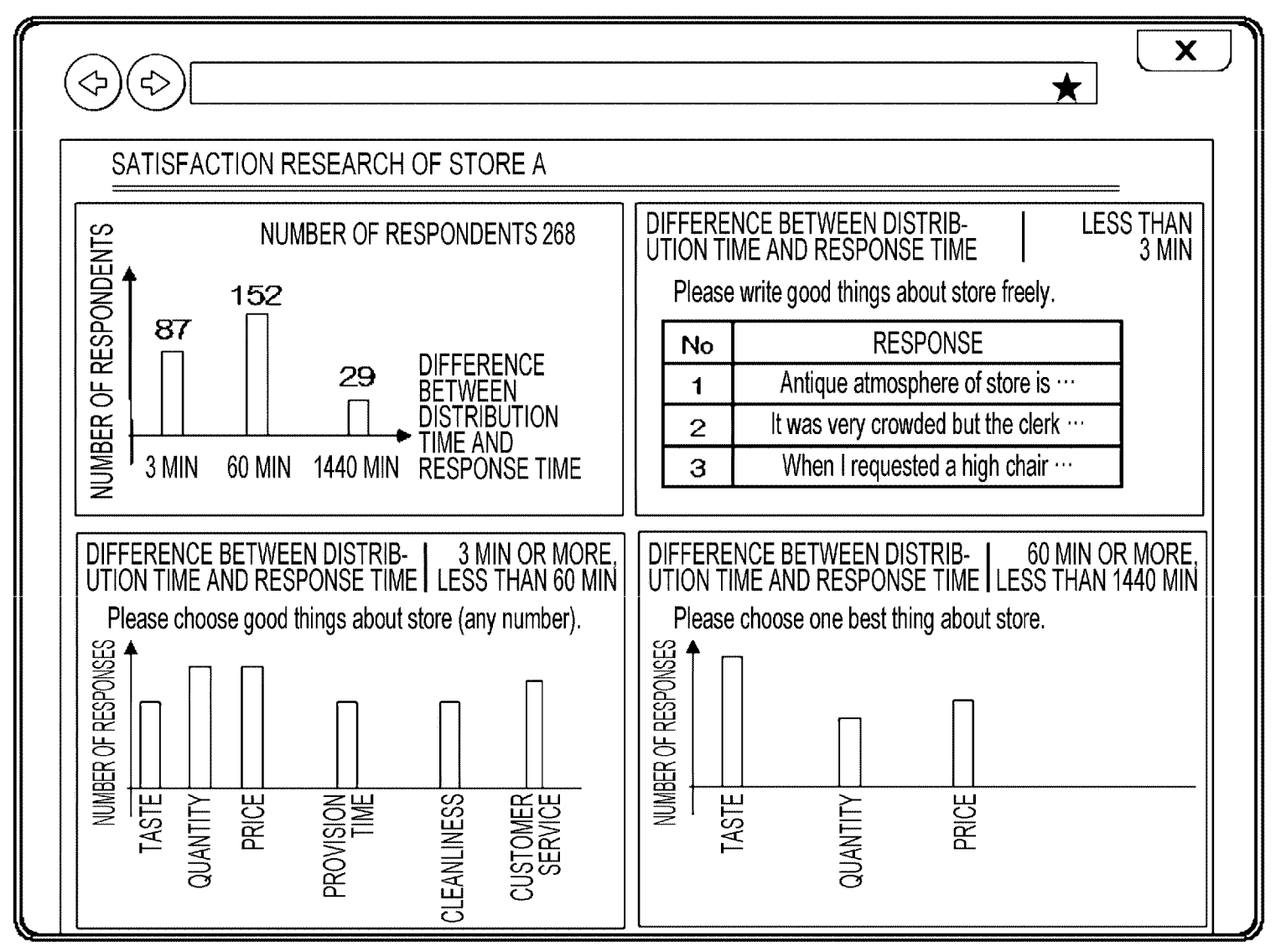

The response aggregating unit 13 aggregates responses for each question ID, in response information including the same question group ID stored in the response DB 24. The response aggregating unit 13 outputs an aggregation result of each question ID. The response aggregating unit 13 transmits the aggregation result to a terminal of a requester in response to a request from the terminal connected to the questionnaire distribution device 70 via a network. The display example of the aggregation result is illustrated in FIG. 34.

Sixth Exemplary Embodiment

In the above described exemplary embodiment, a server selects a question according to a time difference between an event-associated date and time and an expected response date and time among plural questions, but the question according to the time difference may be selected at a terminal side. An exemplary embodiment in this case will be described below.

Figure 35:
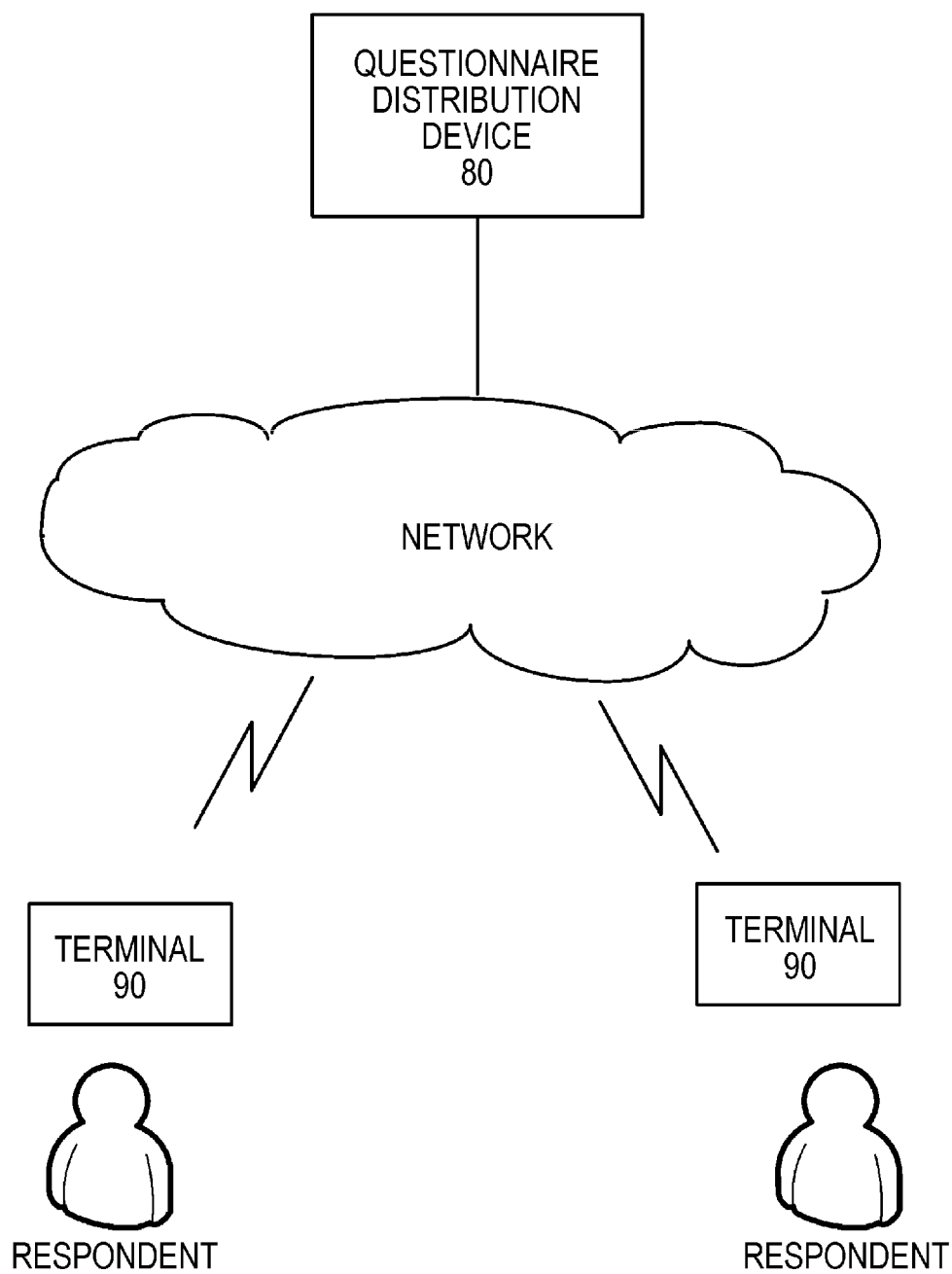
FIG. 35 is a view illustrating a configuration of a questionnaire distribution system according to a sixth exemplary embodiment.

FIG. 35 is a view illustrating a configuration of a questionnaire distribution system according to a sixth exemplary embodiment of the present invention. The questionnaire distribution system according to the sixth exemplary embodiment includes a questionnaire distribution device 80 and a terminal 90 connected through a network.

Figure 36:
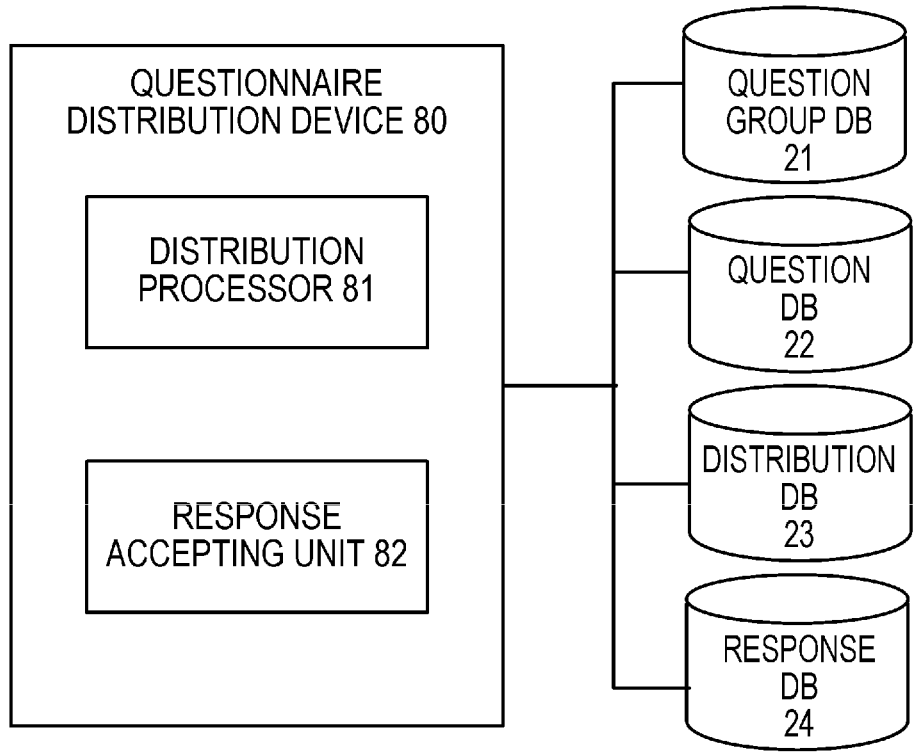
FIG. 36 is a view illustrating an example of a configuration of a questionnaire distribution device according to the sixth exemplary embodiment.

As exemplified in FIG. 36, the questionnaire distribution device 80 includes a distribution processor 81 and a response accepting unit 82.

The questionnaire distribution device 80 is connected to a question group DB 21, a question DB 22, a distribution DB 23, and a response DB 24 through a network such as a LAN. The question group DB 21, the question DB 22, the distribution DB 23, and the response DB 24 have the same configurations as those in the first and second exemplary embodiments. The questionnaire distribution device 80 may include the question group DB 21, the question DB 22, the distribution DB 23, and the response DB 24.

The distribution processor 81 selects question group information satisfying a distribution condition from the question group DB 21, and acquires plural pieces of question information corresponding to the selected question group information, from the question DB 22.

The distribution processor 81 distributes plural pieces of question information acquired from the question DB 22 to the terminal 90 of a distribution target person indicated by question group information selected from the question group DB 21.

The distribution processor 81 registers information indicating distribution contents, in the distribution DB 23. A distribution form of questions is arbitrary. For example, a notification such as an e-mail affixed with a link for downloading plural questions may be transmitted to the terminal 90 of a target person.

The response accepting unit 82 receives information of a response from the terminal 90 and stores the information in the response DB 24.

Figure 37:
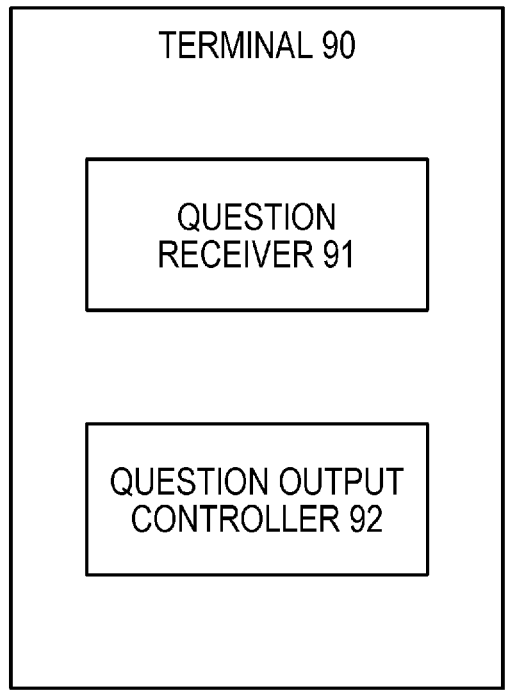
FIG. 37 is a view illustrating an example of a configuration of a terminal according to the sixth exemplary embodiment.

The terminal 90 is an information processing apparatus including a processor, a memory, a display, an input unit, a communication unit, and the like. As exemplified in FIG. 37, the terminal 90 includes a question receiver 91 and a question output controller 92.

The question receiver 91 receives plural pieces of question information belonging to the same question group distributed from the questionnaire distribution device 80, and stores the pieces of question information in the storage area.

The question output controller 92 selects question information corresponding to a time difference between an event-associated date and time and an expected response date and time which is a date and time at which a respondent is likely to respond, among plural pieces of question information of the same question group stored in the storage area, and displays a question of the selected question information.

The event-associated date and time may be, for example, an occurrence date and time of an event, a reception date and time of questions about an event, or the like. In the present exemplary embodiment, a reception date and time of questions about an event is set as an event-associated date and time.

The expected response date and time may be, for example, a date and time at which a respondent tries to start responding to a questionnaire, a date and time at which the terminal 90 detects an input operation for a questionnaire response by a respondent, or the like. In the present exemplary embodiment, a date and time at which the terminal 90 detects an input operation for a questionnaire response by a respondent is set as the expected response date and time. In the input operation for the questionnaire response, a question group of questions as response targets is specified.

When selecting question information corresponding to a time difference between an event-associated date and time and an expected response date and time among plural pieces of question information, the question output controller 92 refers to a response valid time range in each question information to select question information in which the time difference falls within a range indicated by the response valid time range.

The question output controller 92 displays a question of the selected question information. The question output controller 92 transmits information of a response input for the displayed question to the questionnaire distribution device 80.

Figure 38:
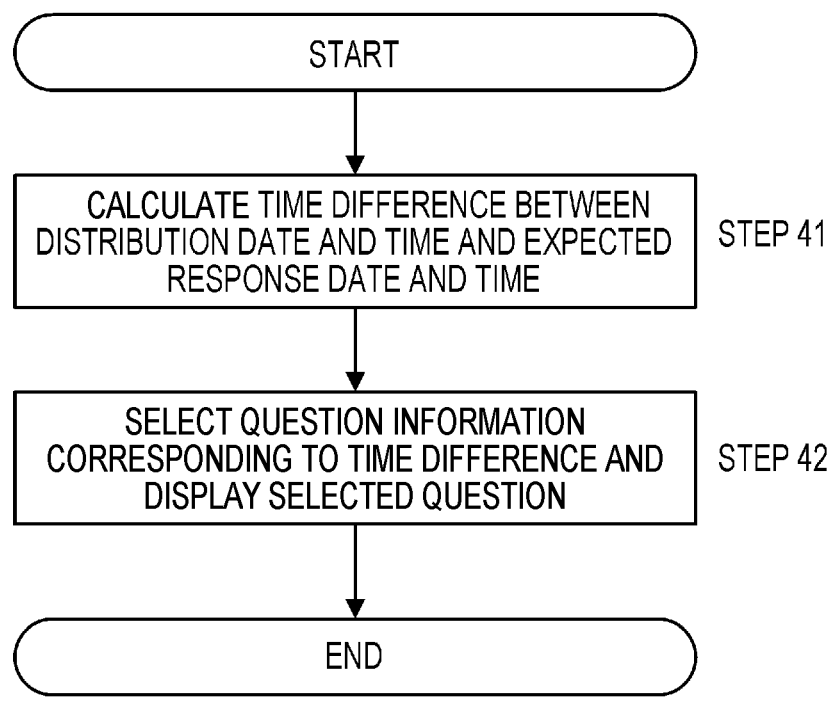
FIG. 38 is a flow chart for explaining a question selection process of the sixth exemplary embodiment.

FIG. 38 illustrates a flowchart of a question selection process in which the terminal 90 selects question information among plural pieces of question information and displays the question information.

When a user performs an input operation so as to respond to a question of a certain question group stored in the terminal 90, the question output controller 92 calculates a time difference between a reception date and time of question information of the question group and an expected response date and time (step 41).

The question output controller 92 selects question information corresponding to the time difference calculated in step 41 among plural pieces of question information belonging to the question group as a response target, and displays a question of the selected question information (step 42).

Figure 39:
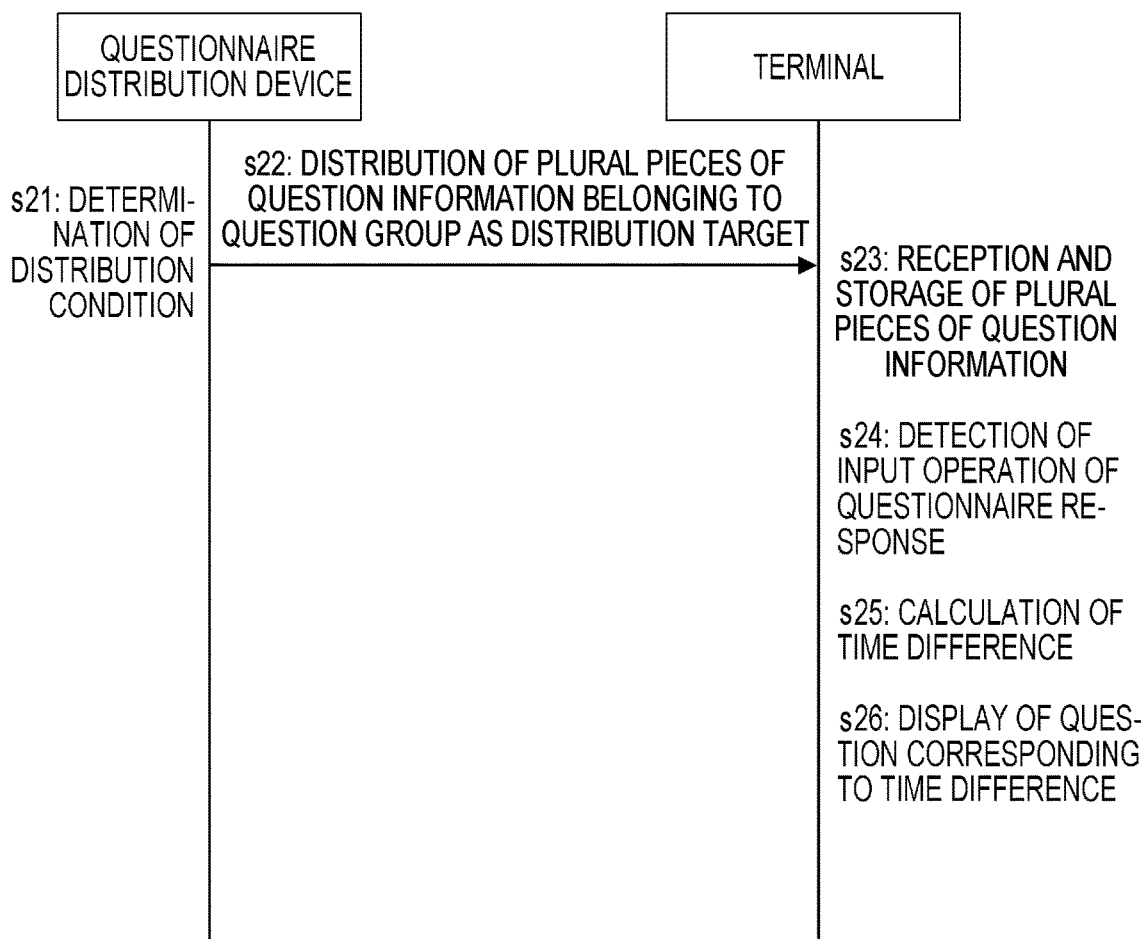
FIG. 39 is a sequence diagram for explaining an operation of the sixth exemplary embodiment.

The operation of the questionnaire distribution system according to the present exemplary embodiment will be described with reference to a sequence diagram of FIG. 39.

When determining that certain question group information of the question group DB 21 matches a distribution condition (s21), the distribution processor 81 of the questionnaire distribution device 80 reads plural pieces of question information belonging to the question group information from the question DB 22, and distributes the pieces of question information to the terminal 90 of the corresponding user (s22).

The question receiver 91 of the terminal 90 receives plural pieces of question information belonging to the same question group distributed from the questionnaire distribution device 80, and stores the pieces of question information in the storage area (s23).

When detecting an input operation for a questionnaire response by a user (s24), the question output controller 92 sets the detection time as an expected response time, and calculates a time difference between the expected response time and a reception time of question information of the question group as a response target (s25).

The question output controller 92 selects question information having a response valid time range corresponding to the calculated time difference among plural pieces of question information belonging to the question group as a response target, and displays a question of the selected question information (s26).

Some or all of the above exemplary embodiments may also be described as the following appendix, but are not limited to the following.

Appendix 1

An information processing apparatus including:
at least one processor,
wherein the processor selects and outputs an easier question to respond from plural questions as a time difference between a time associated with an event and an expected response time which is a time at which a respondent of a question about the event is likely to respond is larger.

The present invention has been described above with reference to exemplary embodiments, but the present invention is not necessarily limited to the above described exemplary embodiments, and various modifications may be made within the scope of a technical spirit thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
    a database including a memory that stores a plurality of questions about an event in association with a different respective expected response time indicating a time period during which a respondent of the question is likely to respond to the question, the memory storing the questions in association with the expected response times with a difficulty of each question having an inverse relationship with the expected response time such that easier questions are stored in association with longer expected response times; and
    a processor programmed to
        select an initial question for the respondent to respond to from the plurality of questions stored in the database based on the expected response time associated with the initial question and a time difference between a time of the event and the expected response time,
        acquire an easier question that is easier than the initial question, and dynamically change the initial question to the easier question based on the time difference as the time difference increases,
        acquire a screen scroll amount of a screen of a mobile device to which the initial question was outputted by the processor and which is currently displaying the initial question, the mobile device being disposed remotely from the processor, the screen scroll amount indicating a progress status with respect to the initial question,
        output the easier question at a scheduled distribution time in response to determining that the screen scroll amount is less than a screen scroll threshold, and
        suppress output of the easier question at the scheduled distribution time in response to determining that the screen scroll amount is equal to or greater than the screen scroll threshold.

2. The information processing system according to claim 1, wherein the easier question is a first question of the plurality of questions having a smaller number of response choices or having a larger number of characters than a second question of the plurality of questions, and the initial question is the second question of the plurality of questions.

3. The information processing system according to claim 2, wherein the easier question has a smaller number of response choices as the time difference increases.

4. The information processing system according to claim 1, wherein
    the plurality of questions includes a first question associated with a first type of response item and a second question associated with a second type of response item, and
    the processor
        selects the first question as the initial question when the time difference between the time associated with the event and the expected response time is equal to or less than a predetermined time, and
        acquires the second question as the easier question when the time difference is greater than the predetermined time.

5. The information processing system according to claim 2, wherein
    the first question is associated with a first type of response item and the second question is associated with a second type of response item, and
    the processor
        selects the second question as the initial question when the time difference between the time associated with the event and the expected response time is equal to or less than a predetermined time, and
        acquires the first question as the easier question when the time difference is greater than the predetermined time.

6. The information processing system according to claim 3, wherein
    the first question is associated with a first type of response item and the second question is associated with a second type of response item, and
    the processor
        selects the second question as the initial question when the time difference between the time associated with the event and the expected response time is equal to or less than a predetermined time, and
        acquires the first question as the easier question when the time difference is greater than the predetermined time.

7. The information processing system according to claim 1, wherein the processor acquires a question including at least one of an image or a sound when the time difference between the time associated with the event and the expected response time is greater than a predetermined time as the easier question.

8. The information processing system according to claim 2, wherein the first question is a question including at least one of an image or a sound when the time difference between the time associated with the event and the expected response time is greater than a predetermined time.

9. The information processing system according to claim 3, wherein the first question is a question including at least one of an image or a sound when the time difference between the time associated with the event and the expected response time is greater than a predetermined time.

10. The information processing system according to claim 4, wherein the acquired second question is a question including at least one of an image or a sound when the time difference between the time associated with the event and the expected response time is greater than the predetermined time.

11. The information processing system according to claim 5, wherein the first question is a question including at least one of an image or a sound when the time difference between the time associated with the event and the expected response time is greater than the predetermined time.

12. The information processing system according to claim 6, wherein the first question is a question including at least one of an image or a sound when the time difference between the time associated with the event and the expected response time is greater than the predetermined time.

13. The information processing system according to claim 1, wherein the processor re-calculates the time difference when a predetermined time elapses after the initial question has been output, and outputs the easier question associated with a second expected response time corresponding to the re-calculated time difference when the easier question is different from the initial question.

14. The information processing system according to claim 13, wherein, even in a case where the easier question corresponding to the re-calculated time difference is different from the initial question, when a response situation satisfies a predetermined condition, the processor does not output the easier question corresponding to the re-calculated time difference.

15. The information processing system according to any claim 1, wherein the processor outputs the easier question according to (i) the time difference between the time associated with the event and the expected response time and (ii) an age of the respondent.

16. The information processing system according to claim 1, wherein the processor outputs the easier question according to (i) the time difference between the time associated with the event and the expected response time and (ii) a difference between an event-associated position and a position of the respondent.

17. The information processing system according to claim 1, wherein the plurality of questions are stored in order of difficulty.

* * * * *